United States Patent
Herbert et al.

(10) Patent No.: US 11,333,803 B2
(45) Date of Patent: May 17, 2022

(54) FLUID LENS WITH LOW ENERGY MEMBRANE ADJUSTMENT

(71) Applicant: Facebook Technologies, LLC, Menlo Park, CA (US)

(72) Inventors: Andrew Alexander Herbert, Bedfordshire (GB); Robert Edward Stevens, Eynsham (GB); Thomas Norman Llyn Jacoby, Oxfordshire (GB); Andrew John Ouderkirk, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 42 days.

(21) Appl. No.: 16/861,134

(22) Filed: Apr. 28, 2020

(65) Prior Publication Data
US 2020/0363566 A1   Nov. 19, 2020

Related U.S. Application Data

(60) Provisional application No. 62/848,994, filed on May 16, 2019.

(51) Int. Cl.
G02B 3/14  (2006.01)
G02B 26/00  (2006.01)

(52) U.S. Cl.
CPC ............. *G02B 3/14* (2013.01); *G02B 26/004* (2013.01)

(58) Field of Classification Search
CPC ... G02B 1/06; G02B 3/12; G02B 3/14; G02B 26/004; G02C 7/085
See application file for complete search history.

(56) References Cited

U.S. PATENT DOCUMENTS 5,138,494 A   8/1992  Kurtin
5,371,629 A  12/1994  Kurtin et al.
(Continued)

FOREIGN PATENT DOCUMENTS

WO   2013/143630 A1   10/2013
WO   2013/144533 A1   10/2013
(Continued)

OTHER PUBLICATIONS

International Search Report and Written Opinion received for PCT Application Serial No. PCT/US2020/033234 dated Sep. 11, 2020, 15 pages.

*Primary Examiner* — Joseph P Martinez
(74) *Attorney, Agent, or Firm* — FisherBroyles, LLP

(57) ABSTRACT

Examples include a device including a fluid lens having a membrane (that may be in elastic tension), a substrate, a fluid at least partially enclosed between the membrane and the substrate, and a support structure configured to provide a guide path for an edge portion of the membrane, such as a membrane attachment at a periphery of the membrane. The guide path may be configured to greatly reduce (or substantially eliminate) changes in the elastic energy of the membrane as the membrane profile is adjusted. The guide path may be configured so that the elastic force exerted by the membrane is generally normal to the guide path for each location on the guide path. Adjustment of the membrane profile may include applying an actuation force that is normal to the elastic force exerted by the membrane. Various other methods and apparatus are also disclosed.

20 Claims, 14 Drawing Sheets

(56) References Cited

U.S. PATENT DOCUMENTS

| | | |
|---|---|---|
| 5,668,620 A | 9/1997 | Kurtin et al. |
| 5,696,521 A | 12/1997 | Robinson et al. |
| 5,956,183 A | 9/1999 | Epstein et al. |
| 5,999,328 A | 12/1999 | Kurtin et al. |
| 7,256,943 B1 | 8/2007 | Kobrin et al. |
| 8,254,034 B1 | 8/2012 | Shields et al. |
| 10,634,824 B1 | 4/2020 | Ouderkirk et al. |
| 2003/0095336 A1 | 5/2003 | Floyd |
| 2004/0156983 A1 | 8/2004 | Moravec et al. |
| 2006/0077562 A1 | 4/2006 | Silver |
| 2006/0163612 A1 | 7/2006 | Kouvetakis et al. |
| 2007/0279585 A1 | 12/2007 | Bartoli |
| 2008/0001169 A1 | 1/2008 | Lochtefeld |
| 2008/0207846 A1 | 8/2008 | Henze et al. |
| 2008/0239503 A1 | 10/2008 | Conradi et al. |
| 2008/0257409 A1 | 10/2008 | Li et al. |
| 2009/0147371 A1 | 6/2009 | Lee et al. |
| 2010/0068866 A1 | 3/2010 | Yu et al. |
| 2010/0118413 A1 | 5/2010 | Kim et al. |
| 2010/0176375 A1 | 7/2010 | Lochtefeld |
| 2010/0182703 A1 | 7/2010 | Bolis |
| 2010/0252861 A1 | 10/2010 | Lochtefeld |
| 2011/0085131 A1 | 4/2011 | Gupta et al. |
| 2011/0085243 A1 | 4/2011 | Gupta et al. |
| 2012/0041553 A1 | 2/2012 | Gupta et al. |
| 2012/0287512 A1 | 11/2012 | Egan et al. |
| 2014/0077220 A1 | 3/2014 | Kryliouk et al. |
| 2014/0253873 A1 | 9/2014 | Crosby et al. |
| 2014/0261611 A1 | 9/2014 | King et al. |
| 2015/0055084 A1* | 2/2015 | Stevens ............ G02C 7/085 351/159.68 |
| 2015/0116656 A1 | 4/2015 | Stevens et al. |
| 2015/0185480 A1 | 7/2015 | Ouderkirk et al. |
| 2016/0049299 A1 | 2/2016 | Ko et al. |
| 2016/0223837 A1 | 8/2016 | Holland et al. |
| 2016/0320625 A1* | 11/2016 | von und zu Liechtenstein ............ H04N 13/00 |
| 2017/0269378 A1 | 9/2017 | Stevens et al. |
| 2019/0097080 A1 | 3/2019 | Ide |
| 2019/0258084 A1 | 8/2019 | Stevens et al. |

FOREIGN PATENT DOCUMENTS

| | | |
|---|---|---|
| WO | 2018/158347 A1 | 9/2018 |
| WO | 2019/186181 A1 | 10/2019 |

* cited by examiner

FLUID LENS WITH LOW ENERGY MEMBRANE ADJUSTMENT

CROSS REFERENCE TO RELATED APPLICATION

This application claims the benefit of U.S. Provisional Application No. 62/848,994, filed May 16, 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1A:
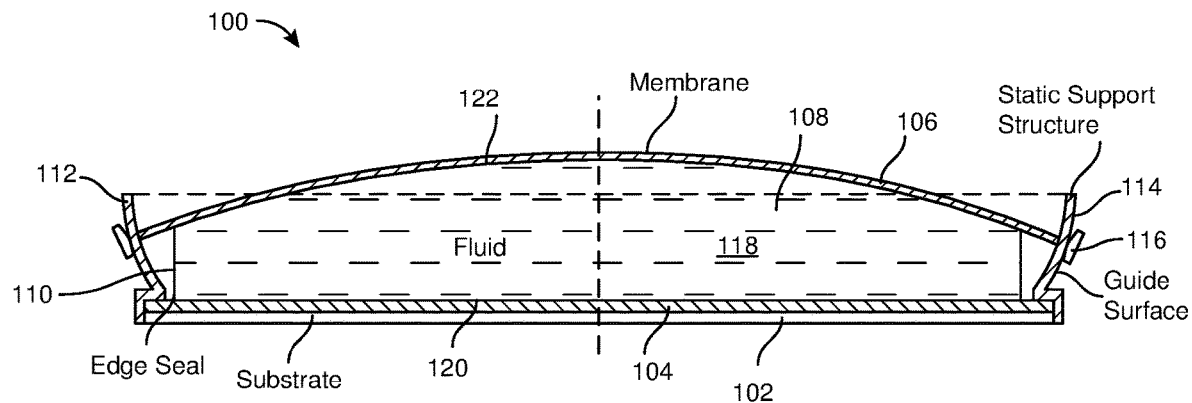
FIGS. 1A-1C illustrate example fluid lenses.

Throughout the drawings and appendices, identical reference characters and descriptions indicate similar, but not necessarily identical, elements. While the exemplary embodiments described herein are susceptible to various modifications and alternative forms, specific embodiments have been shown by way of example in the drawings and appendices and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to fluid lenses, such as adjustable fluid lenses. As will be explained in greater detail below, embodiments of the present disclosure may include adjustable liquid lenses, membranes configured for use in fluid lenses, membrane assemblies that may include a peripheral guide wire, and improved devices using fluid lenses, such as ophthalmic devices. Fluid lenses may include lenses having an elastomeric or otherwise deformable element (such as a membrane), a substrate, and a fluid.

Figure 9:
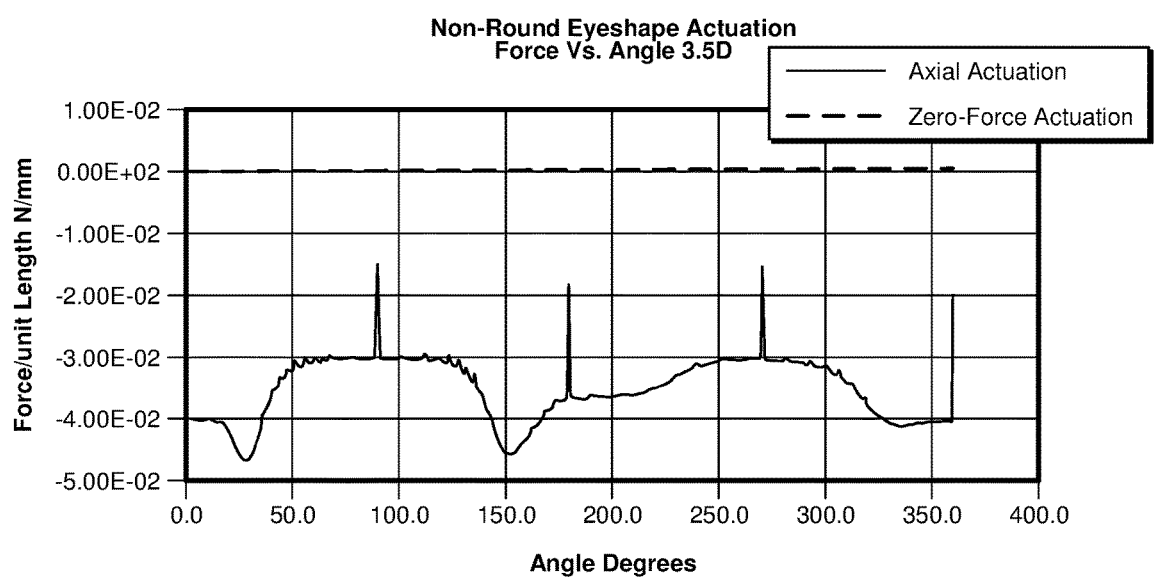
FIG. 9 illustrates actuation of an example non-circular fluid lens, according to some embodiments.
Figure 10:
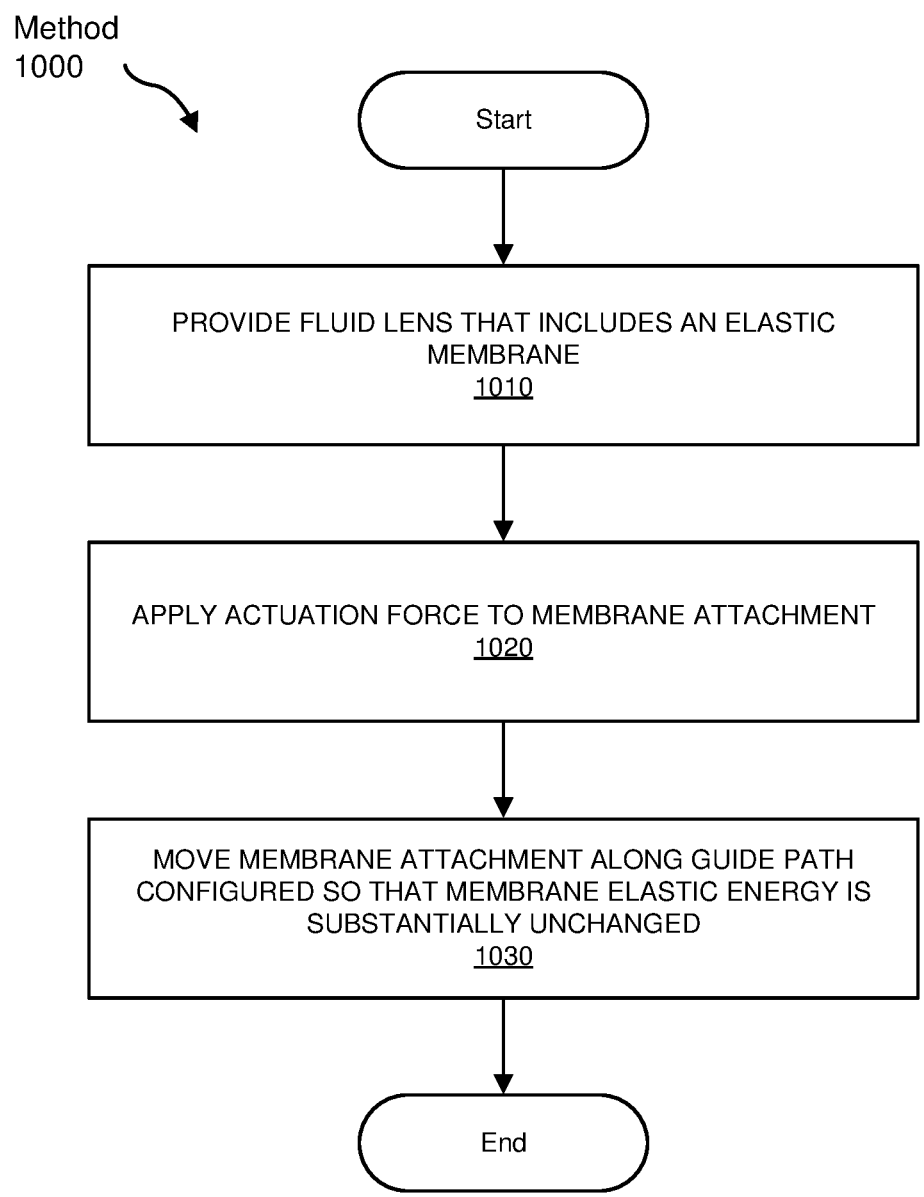
FIGS. 10-11 illustrate example methods of operating a device.
Figure 11:
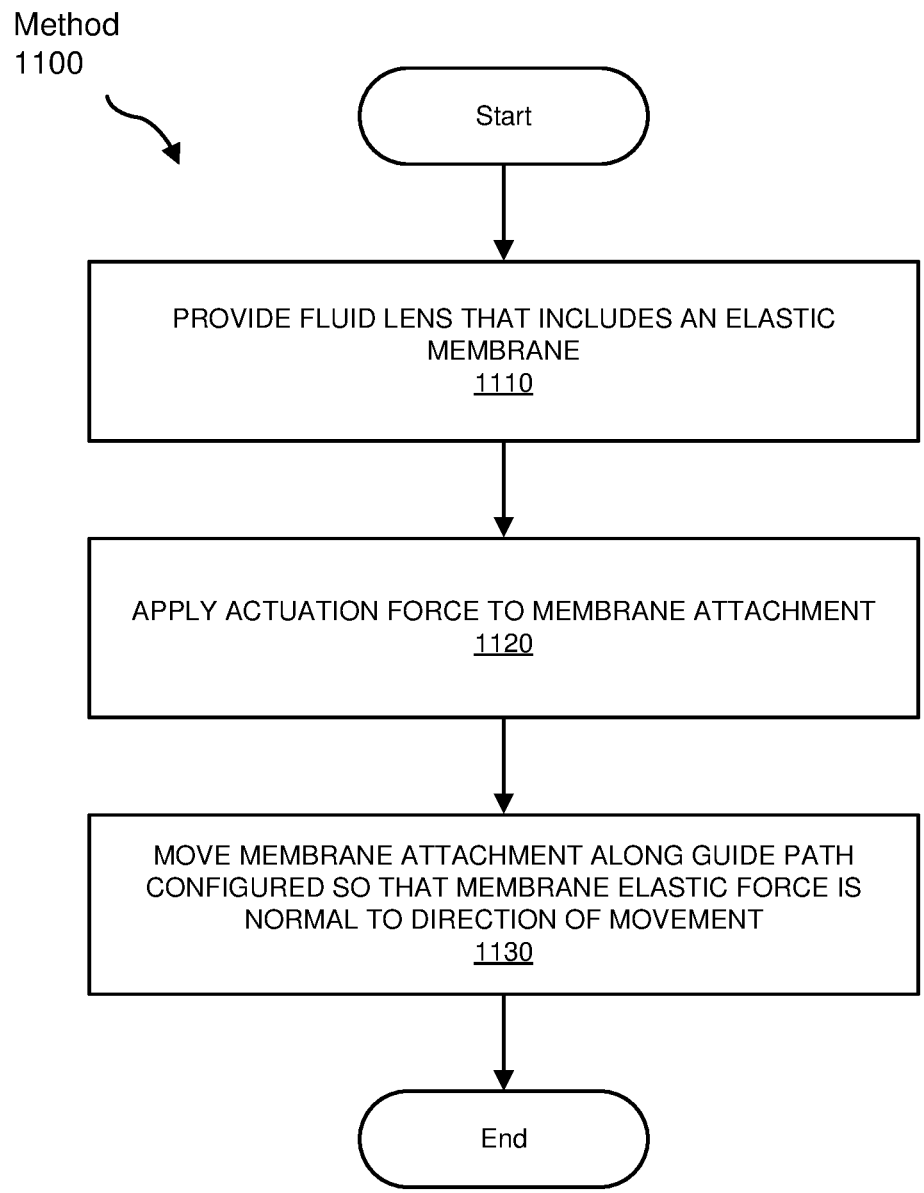
Figure 12:
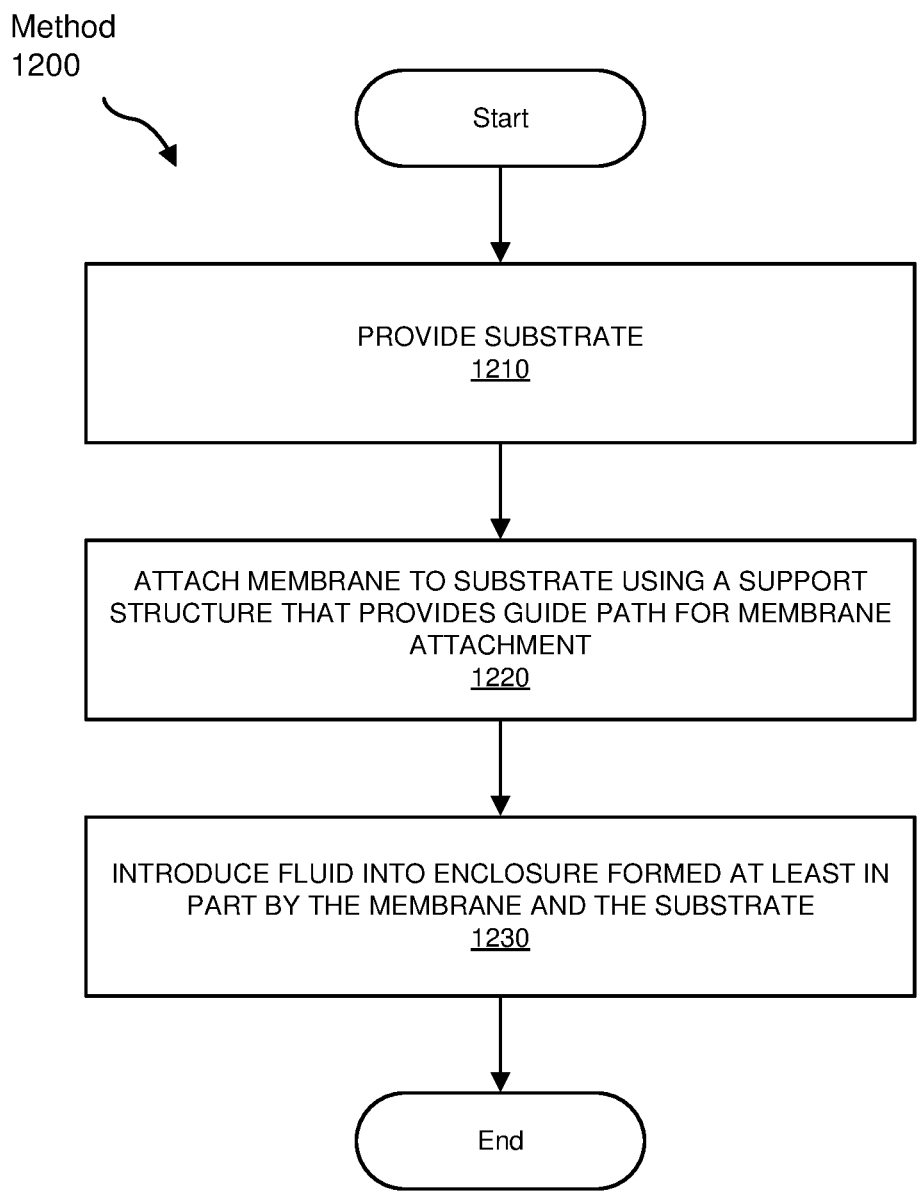
FIG. 12 illustrates an example method of fabricating a device.
Figure 13:
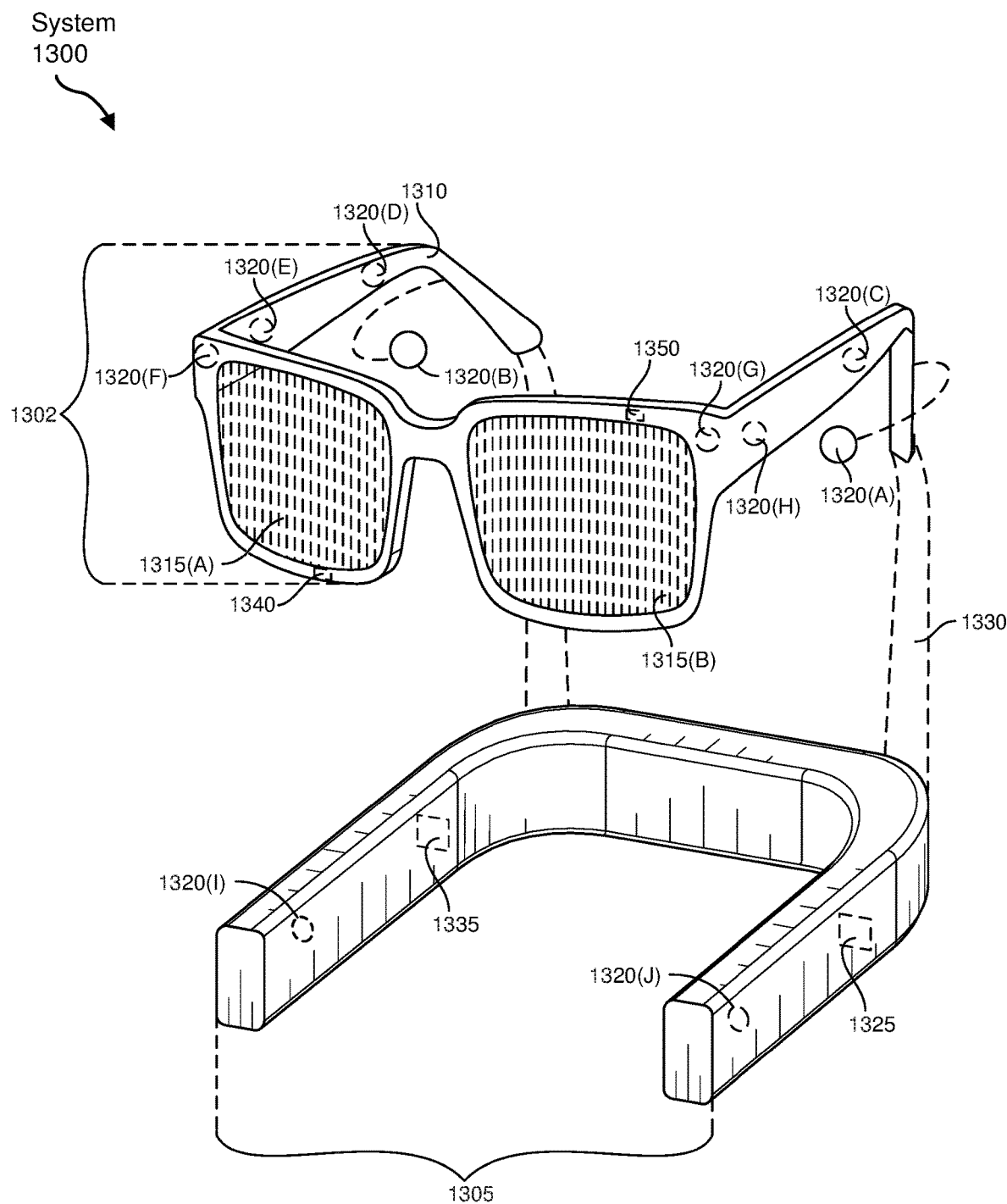
FIG. 13 is an illustration of exemplary augmented-reality glasses that may be used in connection with embodiments of this disclosure.
Figure 14:
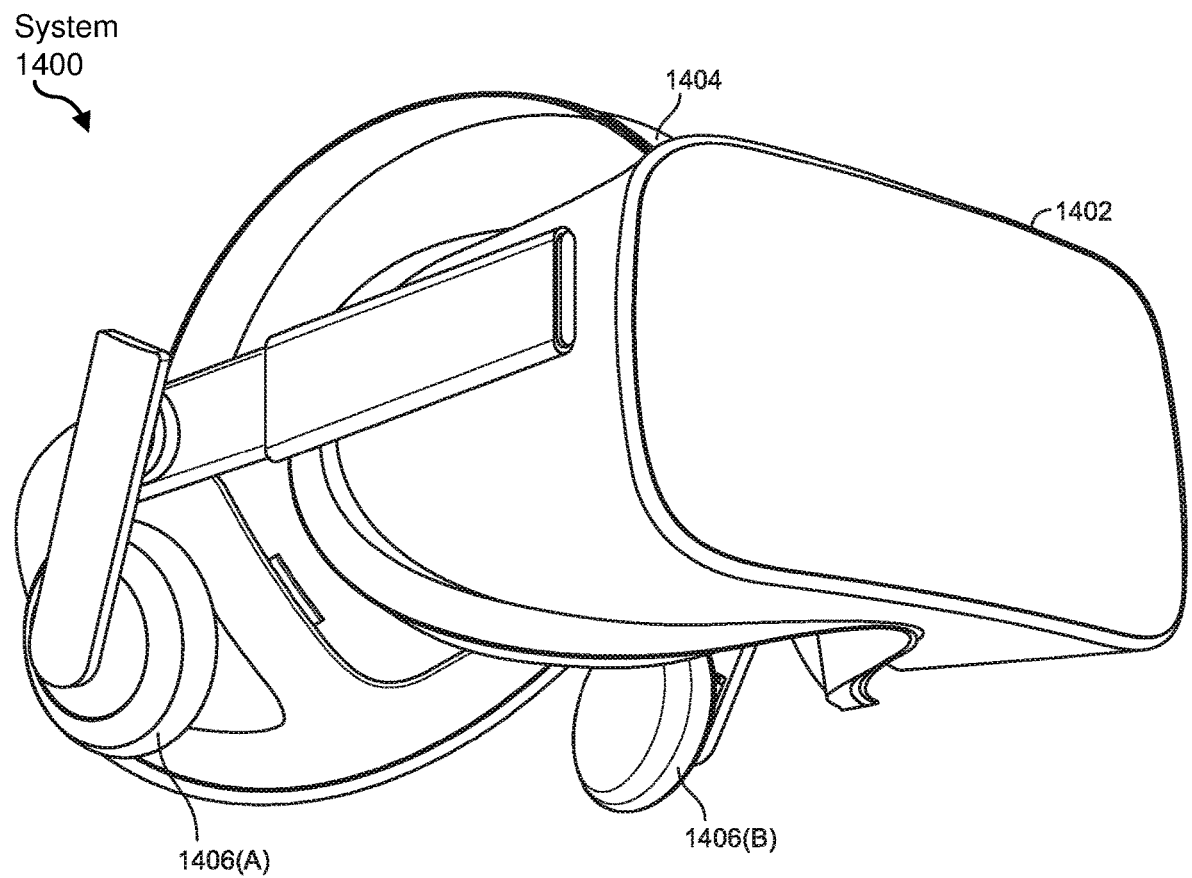
FIG. 14 is an illustration of an exemplary virtual-reality headset that may be used in connection with embodiments of this disclosure.

The following will provide, with reference to FIGS. 1-14, detailed descriptions of various examples. FIGS. 1A-2G illustrate example fluid lenses. FIG. 3 illustrates an ophthalmic device that may include one or more fluid lenses. FIGS. 4-8 depict example fluid lenses. FIG. 9 shows data relating to actuation forces. FIGS. 10-12 illustrate example methods of operating or fabricating a device. FIGS. 13 and 14 show example augmented reality and virtual reality devices.

An adjustable fluid lens may be configured so that adjustment of the membrane profile may result in no appreciable change in the elastic energy of the membrane. This configuration may be termed a "zero-strain" device configuration, as, in some examples, adjustment of at least one membrane edge portion, such as at least one control point, along a respective guide path does not appreciably change the strain energy of the membrane. In some examples, a "zero-strain" device configuration may reduce the actuation force required by an order of magnitude when compared with a conventional support beam type configuration. A conventional fluid lens may, for example, require an actuation force that is greater than 1N for an actuation distance of 1 mm. Using a "zero-strain" device configuration, actuation forces may be 0.1N or less for an actuation of 1 mm, for quasi-static actuation. This substantial reduction of actuation forces may enable the use of smaller, more speed-efficient actuators in fluid lenses, resulting in a more compact and efficient form factor. In such examples, in a "zero-strain" device configuration, the membrane may actually be under appreciable strain, but the total strain energy in the membrane may not change appreciably as the lens is adjusted. This may advantageously greatly reduce the force needed to adjust the fluid lens.

In some examples, an adjustable fluid lens (such as a liquid lens) includes a pre-strained flexible membrane that at least partially encloses a fluid volume, a fluid enclosed within the fluid volume, a flexible edge seal that defines a periphery of the fluid volume, and an actuation system configured to control the edge of the membrane such that the optical power of the lens can be modified. In some examples, movement of an edge portion of the membrane, such as a control point, along a guide path provided by a support structure may result in no appreciable change in the elastic energy of the membrane. The membrane profile may be adjusted by movement of a plurality of control points along respective guide paths, and this may result in no appreciable change in the elastic energy of the membrane. The membrane may be an elastic membrane, and the membrane profile may be a curved profile providing a refractive surface of the fluid lens.

FIG. 1A depicts a cross-section through a fluid lens, according to some embodiments. The fluid lens 100 illustrated in this example includes a substrate 102 (which in this example is a generally rigid, planar substrate), a substrate coating 104, a membrane 106, a fluid 108 (denoted by dashed horizontal lines), an edge seal 110, a support structure 112 providing a guide surface 114, and a membrane attachment 116. In this example, the substrate 102 has a lower (as illustrated) outer surface, and an interior surface on which the substrate coating 104 is supported. The interior surface 120 of the coating 104 is in contact with the fluid 108. The membrane 106 has an upper (as illustrated) outer surface and an interior surface 122 bounding the fluid 108.

The fluid 108 is enclosed within an enclosure 118, which is at least in part defined by the substrate 102 (along with the coating 104), the membrane 106, and the edge seal 110, which here cooperatively define the enclosure 118 in which the fluid 108 is located. The edge seal 110 may extend around the periphery of the enclosure 118, and retain (in cooperation with the substrate and the membrane) the fluid within the enclosed fluid volume of the enclosure 118. In some examples, an enclosure may be referred to a cavity or lens cavity.

In this example, the membrane 106 has a curved profile, so that the enclosure has a greater thickness in the center of the lens than at the periphery of the enclosure (e.g., adjacent the edge seal 110). In some examples, the fluid lens may be a plano-convex lens, with the planar surface being provided by the substrate 102 and the convex surface being provided by the membrane 106. A plano-convex lens may have a thicker layer of lens fluid around the center of the lens. In some examples, the exterior surface of a membrane may provide the convex surface, with the interior surface being substantially adjacent the lens fluid.

The support structure 112 (which in this example may include a guide slot through which the membrane attachment 116 may extend) may extend around the periphery (or within a peripheral region) of the substrate 102, and may attach the membrane to the substrate. The support structure may provide a guide path, in this example a guide surface 114 along which a membrane attachment 116 (e.g., located within an edge portion of the membrane) may slide. The membrane attachment may provide a control point for the membrane, so that the guide path for the membrane attachment may provide a corresponding guide path for a respective control point.

The lens 100 may include one or more actuators (not shown in FIG. 1A) that may be located around the periphery of the lens and may be part of or mechanically coupled to the support structure 112. The actuators may exert a controllable force on the membrane at one or more control points, such as provided by membrane attachment 116, that may be used to adjust the curvature of the membrane surface and hence at least one optical property of the lens, such as focal length, astigmatism correction, surface curvature, cylindricity, or any other controllable optical property. In some examples, the membrane attachment may be attached to an edge portion of the membrane, or to a peripheral structure extending around the periphery of the membrane (such as a peripheral guide wire, or a ring), and may be used to control the curvature of the membrane.

In some examples, FIG. 1A may represent a cross-section through a circular lens, though examples fluid lenses may also include non-circular lenses, as discussed further below.

Figure 1B:
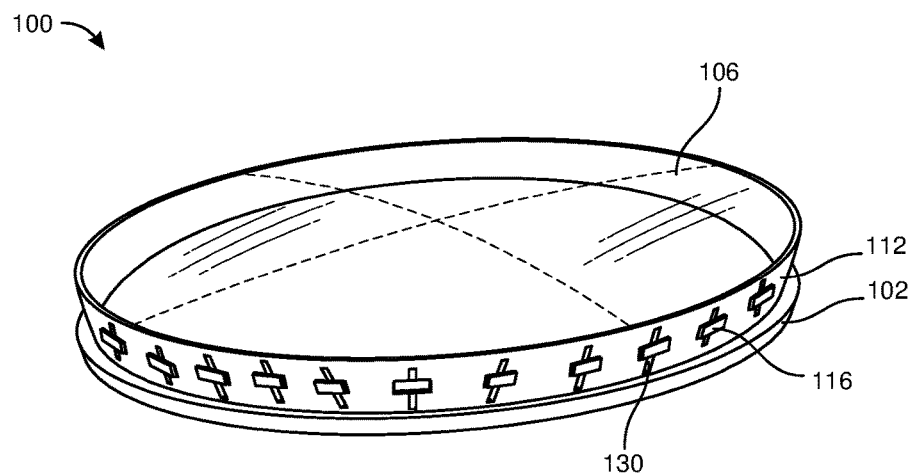

FIG. 1B shows a circular lens, of which FIG. 1A may be a cross-section. The figure shows the lens 100, including the substrate 102, the membrane 106, and the support structure 112. The figure shows the membrane attachment 116 as moveable along a guide path defined by the guide slot 130 and the profile of the guide surface 114 (shown in FIG. 1A). The dashed lines forming a cross are visual guides indicating a general exterior surface profile of the membrane 106. In this example, the membrane profile may correspond to a plano-convex lens.

Figure 1C:
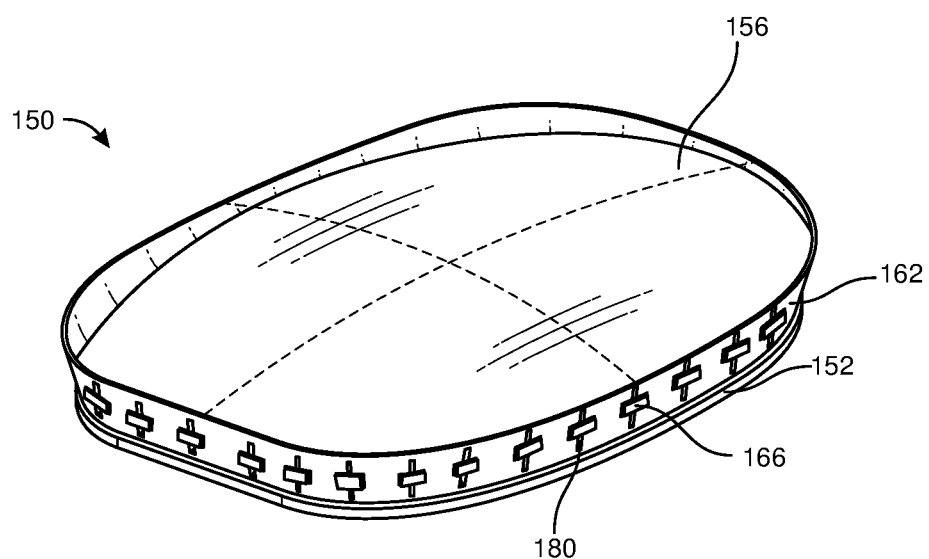

FIG. 1C shows a non-circular lens 150 that may otherwise be similar to the circular lens 100 of FIG. 1B and may have a similar configuration. The non-circular lens 150 includes substrate 152, membrane 156, and support structure 162. The lens has a similar configuration of the membrane attachment 166, movable along a guide path defined by the guide slot 180. The profile of a guide path may be defined by the surface profile of the support structure 162, through which the guide slot is formed. The cross-section of the lens may be analogous to that of FIG. 1A. The dashed lines forming a cross on the membrane 156 are visual guides indicating a general exterior surface profile of the membrane 156. In this example, the membrane profile may correspond to a plano-convex lens.

Figure 2A:
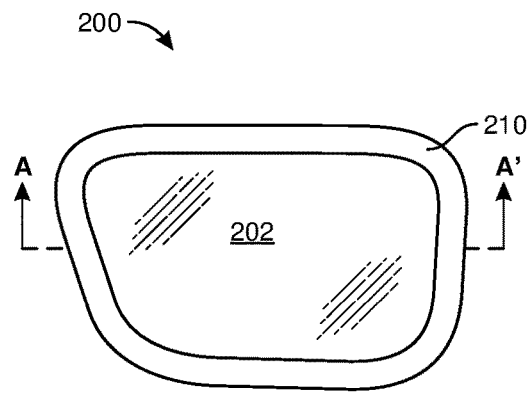
FIGS. 2A-2G illustrate example fluid lenses, and adjustment of the optical power of the fluid lenses, according to some embodiments.

FIGS. 2A-2D illustrate an ophthalmic device 200 including a fluid lens 202, according to some embodiments. FIG. 2A shows a portion of an ophthalmic device 200, which includes a portion of a peripheral structure 210 (that may include a guide wire or a support ring) supporting a fluid lens 202. A support ring need not be circular, and may have a form similar to that of the exterior periphery of the lens.

In some examples, the lens may be supported by a frame. An ophthalmic device (e.g., spectacles, goggles, eye protectors, visors, and the like) may include a pair of fluid lenses, and the frame may include components configured to support the ophthalmic device on the head of a user, for example, using components that interact with (e.g., rest on) the nose and/or ears of the user.

Figure 2B:
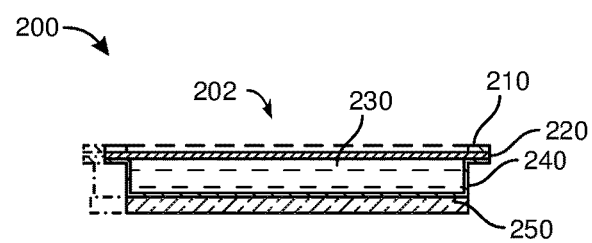
Figure 3:
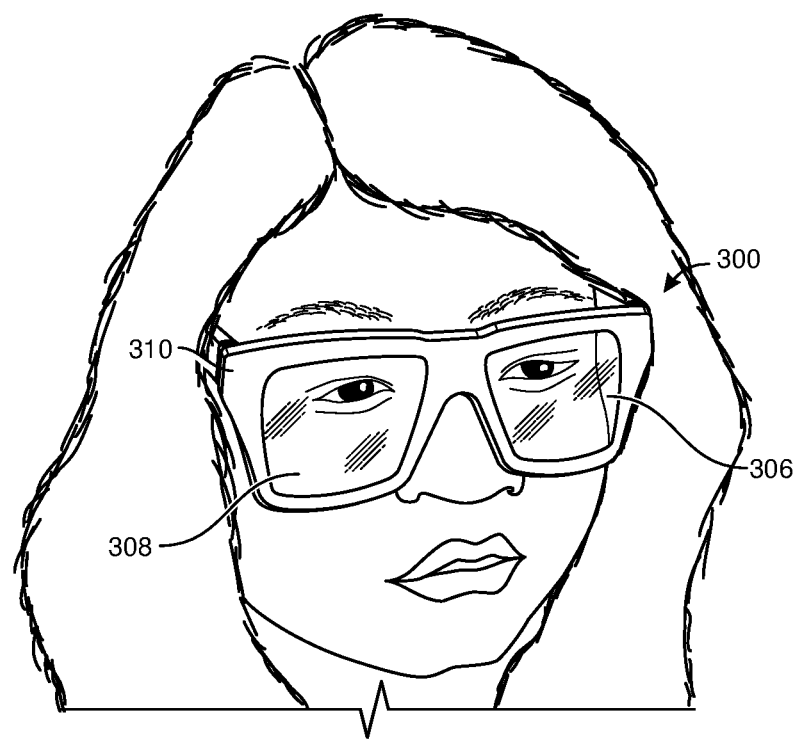
FIG. 3 illustrates an example ophthalmic device.

FIG. 2B shows a cross-section through the device 200, along A-A' as shown in FIG. 2A. The figure shows the peripheral structure 210 and the fluid lens 202. The fluid lens 202 includes a membrane 220, lens fluid 230, an edge seal 240, and a substrate 250. In this example, the substrate 250 includes a generally planar, rigid layer. The figure shows that the fluid lens may have a planar-planar configuration, which in some examples may be adjusted to a plano-concave and/or plano-convex lens configuration.

In some examples disclosed herein, one or both surfaces of the substrate may include a concave or convex surface, and in some examples the substrate may have a non-spherical surface such as a toroidal or freeform optical progressive or digressive surface. In various examples, the substrate may include a plano-concave, plano-convex, biconcave, or biconvex lens, or any other suitable optical element.

Figure 2C:
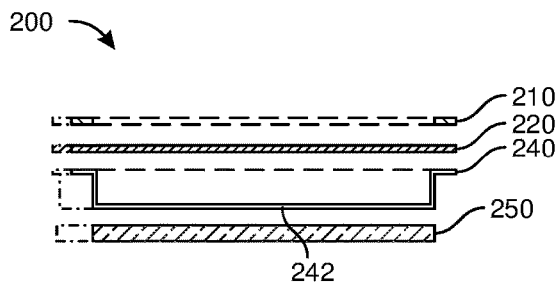

FIG. 2C shows an exploded schematic of the device shown in FIG. 2B, in which corresponding elements have the same numbering as discussed above in relation to FIG. 2A. In this example, the edge seal is joined with a central seal portion 242 extending over the substrate 250.

In some examples, the central seal portion 242 and the edge seal 240 may be a unitary element. In other examples, the edge seal may be a separate element, and the central seal portion 242 may be omitted or replaced by a coating formed on the substrate. In some examples, a coating may be deposited on the interior surface of the seal portion and/or edge seal. In some examples, the lens fluid may be enclosed in a flexible enclosure (sometimes referred to as a bag) that may include an edge seal, a membrane, and a central seal portion. In some examples, the central seal portion may be adhered to a rigid substrate component and may be considered as part of the substrate.

Figure 2D:
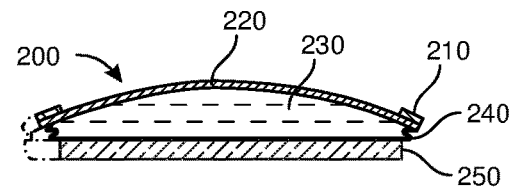

FIG. 2D shows adjustment of the device configuration, for example, by adjustment of forces on the membrane using actuators (not shown). As shown, the device may be configured in a planar-convex fluid lens configuration. In an example plano-convex lens configuration, the membrane 220 tends to extend away from the substrate 250 in a central portion.

In some examples, the lens may also be configured in a planar-concave configuration, in which the membrane tends to curve inwardly towards the substrate in a central portion.

Figure 2E:
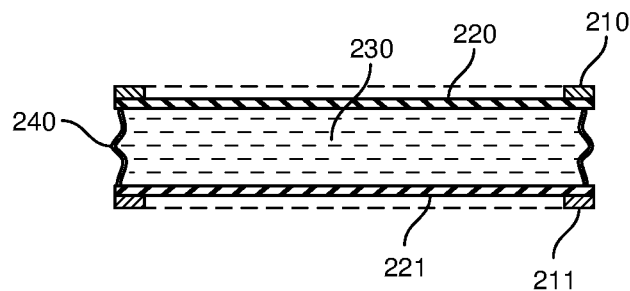

FIG. 2E illustrates a similar device to FIG. 2B, and element numbering is similar. However, in this example, the substrate 250 of the example of FIG. 2B is replaced by a second membrane 221, and there is a second peripheral structure (such as a second support ring) 211. In some examples disclosed herein, the membrane 220 and/or the second membrane 221 may be integrated with the edge seal 240.

Figure 2F:
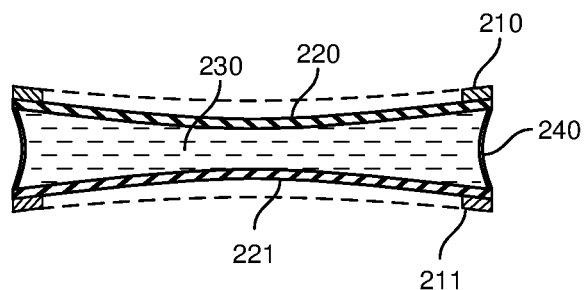

FIG. 2F shows the dual membrane fluid lens of FIG. 2E in a biconcave configuration. For example, application of negative pressure to the lens fluid 230 may be used to induce the biconcave configuration. In some examples, the membrane 220 and second membrane 221 may have similar properties, and the lens configuration may be generally symmetrical, for example, with the membrane and second membrane having similar radii of curvature (e.g., as a symmetric biconvex or biconcave lens). In some examples, the lens may have rotational symmetry about the optical axis of the lens, at least within a central portion of the membrane, or within a circular lens. In some examples, the properties of the two membranes may differ (e.g., in one or more of thickness, composition, membrane tension, or in any other relevant membrane parameter), and/or the radii of curvature may differ.

Figure 2G:
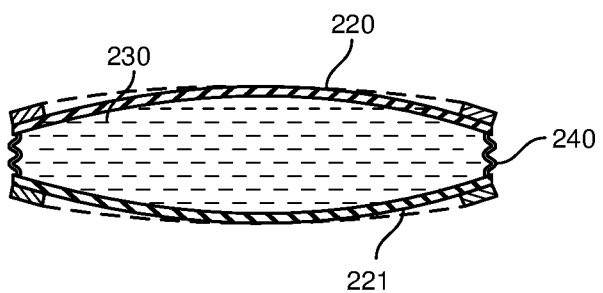

FIG. 2G shows the dual membrane fluid lens of FIG. 2E in a biconvex configuration, with corresponding element numbers.

In some examples, an ophthalmic device, such as an eyewear device, includes one or more fluid lenses. An example device includes at least one fluid lens supported by eyeglass frames. In some examples, an ophthalmic device may include an eyeglass frame, goggles, or any other frame or head-mounted structure to support one or more fluid lenses, such as a pair of fluid lenses.

FIG. 3 illustrates an ophthalmic device including a pair of fluid lenses, according to some embodiments. The example eyewear device 300 may include a pair of fluid lenses, 306 and 308, supported by an eyeglass frame 310 (that may also be referred to as a "frame" for conciseness). The pair of fluid lenses 306 and 308 may be referred to as left and right lenses, respectively (from the viewpoint of the user).

In some examples, an eyewear device (such as eyewear device 300 in FIG. 3) may include a pair of eyeglasses, a pair of smart glasses, an augmented reality device, a virtual reality headset, or the like.

In some examples, the frame 310 may include one or more of any of the following: a battery, a power supply or power supply connection, other refractive lenses (including additional fluid lenses), diffractive elements, displays, eye-tracking components and systems, motion tracking devices, gyroscopes, computing elements, health monitoring devices, cameras, and/or audio recording and/or playback devices (such as microphones and speakers).

Figure 4A:
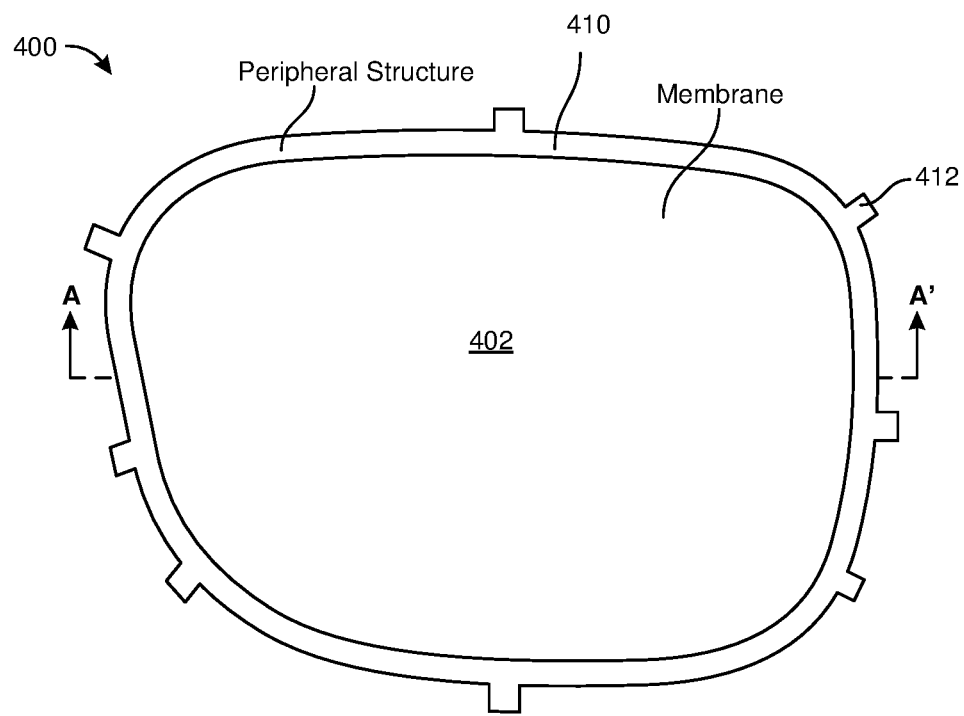
FIGS. 4A-4B illustrate a fluid lens having a membrane assembly including a peripheral structure.

FIG. 4A shows an example fluid lens 400 including a peripheral structure 410 that may generally surround a fluid lens 402. The peripheral structure 410 (in this example, a support ring) includes membrane attachments 412 that may correspond to the locations of control points for the membrane of the fluid lens 402. A membrane attachment may be an actuation point, where the lens may be actuated by displacement (e.g., by an actuator acting along the z-axis) or moved around a hinge point (e.g., where the position of the membrane attachment may be an approximately fixed distance "z" from the substrate). In some examples, the peripheral structure and hence the boundary of the membrane may flex freely between neighboring control points. Hinge points may be used in some embodiments to prevent bending of the peripheral structure (e.g., a support ring) into energetically favorable, but undesirable, shapes.

A rigid peripheral structure, such as a rigid support ring, may limit adjustment of the control points of the membrane. In some examples, such as a non-circular lens, a deformable or flexible peripheral structure, such as a guide wire or a flexible support ring, may be used.

Figure 4B:
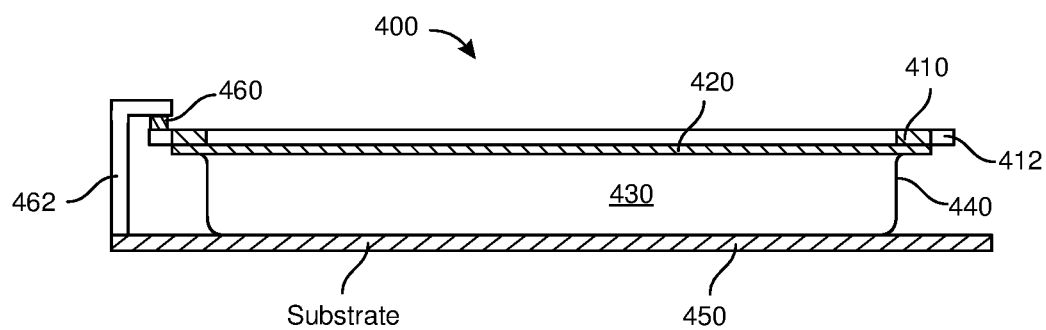

FIG. 4B shows a cross-section of the example fluid lens 400 (e.g., along A-A' as denoted in FIG. 4A). The fluid lens includes a membrane 420, fluid 430, edge seal 440, and substrate 450. In some examples, the peripheral structure 410 may surround and be attached to the membrane 420 of the fluid lens 402. The peripheral structure may include membrane attachments 412 that may provide the control points for the membrane. The position of the membrane attachments (e.g., relative to a frame, substrate, or each other) may be adjusted using one or more actuators, and used to adjust, for example, the optical power of the lens. A membrane attachment having a position adjusted by an actuator may also be referred to as an actuation point, or a control point.

In some examples, an actuator 460 may be attached to actuator support 462, and the actuator be used to vary the distance between the membrane attachment and the substrate, for example, by urging the membrane attachment along an associated guide path. Only one actuator is shown, for illustrative clarity, and any suitable actuator configuration may be used.

In some examples, one or more actuators may be attached to respective actuator supports. In some examples, an actuator support may be attached to one or more actuators. For example, an actuator support may include an arcuate, circular, or other shaped member along which actuators are located at intervals. Actuator supports may be attached to the substrate, or in some examples to another device component such as a frame. In some examples, the actuator may be located on the opposite side of the membrane attachment from the substrate. In some examples, the actuator may be located between the membrane attachment and the substrate, or may be located at another suitable location. In some examples, the force exerted by the actuator may be generally directed along a direction normal to the substrate, or along another direction, such as along a direction at a non-normal direction relative to the substrate. In some examples, at least a component of the force may be generally parallel to the substrate. The path of the membrane attachment may be based on the guide path, and in some examples the force applied by the actuator may have at least an appreciable component directed along the guide path.

Figure 5:
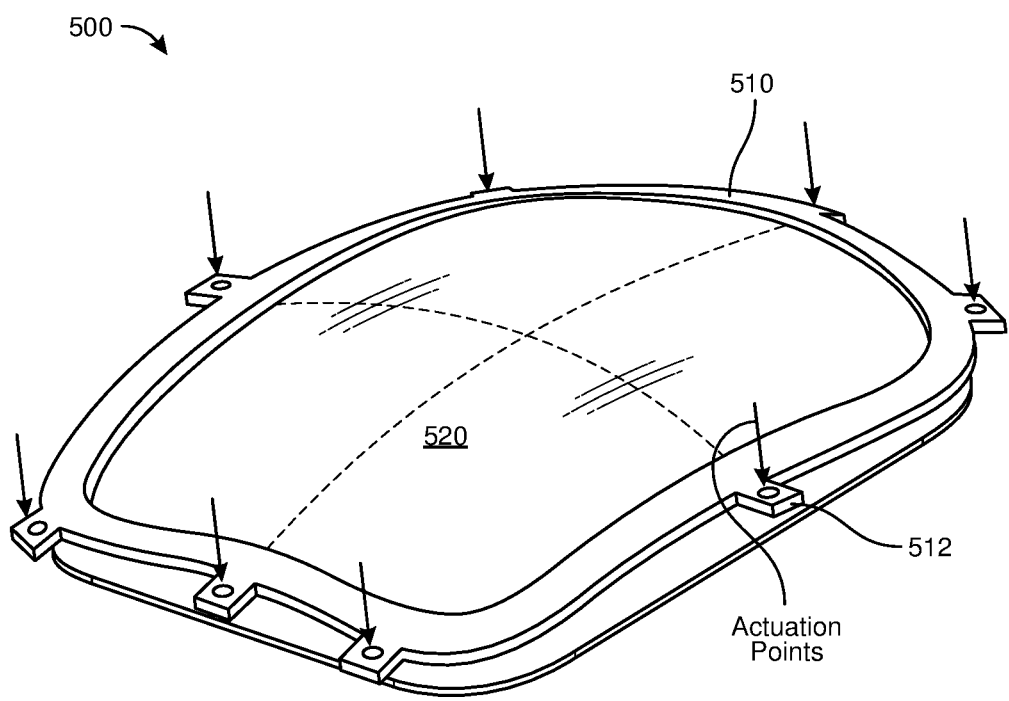
FIG. 5 illustrates deformation of a non-circular fluid lens.

FIG. 5 shows an example fluid lens 500 including a peripheral structure 510, here in the form of the support ring including a plurality of membrane attachments 512, and extending around the periphery of a membrane 520. The membrane attachments may include or interact with one or more support structures that each provide a guide path for an associated control point of the membrane 520. Actuation of the fluid lens may adjust the location of one or more control points of the membrane, for example, along the guide paths provided by the support structures. Actuation may be applied at discrete points on the peripheral structure, for example, the membrane attachments shown. In some examples, the peripheral structure may be flexible, for example, so that the peripheral structure may not be constrained to lie within a single plane.

In some examples, a fluid lens includes a membrane, a support structure, a substrate, and an edge seal. The support structure may be configured to provide a guide path for an edge portion of the membrane (such as a control point provided by a membrane attachment). An example membrane attachment may function as an interface device, configured to mechanically interconnect the membrane and the support structure, and may allow the membrane to exert an elastic force on the support structure. A membrane attachment may be configured to allow the control point of the membrane (that may be located in an edge portion of the membrane) to move freely along the guide path.

In some examples, a fluid lens may be configured to have one or both of the following features: in some examples, the strain energy in the membrane is approximately equal for all actuation states; and in some examples, the force reaction at membrane edge is normal to the guide path. Hence, in some examples, the strain energy of the membrane may be approximately independent of the optical power of the lens. In some examples, the force reaction at the membrane edge is normal to the guide path, for some or all locations on the guide path.

In some examples, movement of the edge portion of the membrane along the guide path may not result in an appreciable change in the elastic energy of the membrane. This configuration may be termed a "zero-strain" guide path, as, in some examples, adjustment of the membrane edge portion along the guide path does not appreciably change the strain energy of the membrane.

Example embodiments described in the present disclosure include apparatuses, systems, and methods related to fluid lenses (such as adjustable fluid-filled lenses), including fluid lenses configured to reduce or effectively eliminate the energy required to actuate a fluid lens with a pre-strained flexible membrane.

The boundary conditions of the membrane may be configured such that the change in strain energy in the membrane between all optical powers of the lens is zero or close to zero. Also, the boundary conditions of the membrane may be configured such that the reaction force is parallel or approximately parallel to the slope of the membrane at the periphery of the membrane, in some examples for all optical powers of the lens.

Example lenses may be configured so that the membrane is in a stable equilibrium state for all optical powers of the lens. Actuation may be required to change the lens configuration, but a lens may be configured so that no external force is required to hold the lens in a selected configuration (such as a selected optical power). In some examples, a lens may be configured so that relatively little or effectively zero energy is required to overcome strain energy in the membrane. In some examples, the energy required to adjust the lens may include that required to overcome friction, hysteresis, viscosity, and dynamic effects, so that greatly reduced or relatively negligible energy is required to adjust the lens from one optical power to another.

The boundary conditions may be configured to create a force bias such that the lens tends to move towards a specific configuration; for example, towards a predetermined optical power within a range of optical powers. This may be used to counteract friction forces or membrane support structure stiffness.

For some applications of adjustable fluid lenses, it may be advantageous to reduce both the energy required for actuation, and the packaging dimensions of the actuation system. Controlling the edge of the membrane may require energy to deform the membrane and/or energy to deform the membrane peripheral structure (such as a flexible support ring or guide wire, e.g., in the example of a non-round lens). These energy requirements may limit the technology choices for actuation and the extent to which the energy supply and the actuator packaging can be reduced. It would be advantageous to reduce or substantially eliminate these energy requirements. Advantages of the approaches described in the present disclosure may include one or more of the following: reduced size actuators, inconspicuous actuators, reduced weight, reduced power requirements, increased battery life, reducing or eliminating the need for external power supplies, and the like. Many of these aspects are particularly advantageous in the case of ophthalmic applications such as glasses or goggles, or for any application related to human use, such as augmented reality or virtual reality systems. A flexible support ring may be non-circular, for example, for use with a non-circular lens.

In some examples, a fluid lens configuration may be configured to reduce the energy required to change the power of the lens to an arbitrarily low value. This may enable the use of low-power actuation technologies that would not be otherwise feasible for use with a conventional fluid lens of similar optical properties and/or enable a reduction in size of the actuator and any energy storage device used.

In some examples, a device includes a membrane, a support structure configured to provide a guide path for an edge portion of the membrane, and a membrane attachment which allows a mechanical interaction between the membrane and an actuator and/or a support structure. A device may also include a peripheral structure disposed around the periphery of the membrane, and at least one membrane attachment may be configured to allow a mechanical connection between the membrane and the support structure, and may allow the membrane to move freely along the guide path. A device may also include a substrate and an edge seal. In some examples, the support structure may be rigid, or semi-rigid, and may be attached to the substrate.

In some examples, an adjustable fluid lens includes a membrane assembly. A membrane assembly may include a membrane (e.g., having a line tension) and a peripheral structure (such as a guide wire, support ring, or any other suitable structure extending around the membrane). A fluid lens may include a membrane assembly, a substrate, and an edge seal. The membrane line tension (an elastic force) may be supported, at least in part, by a peripheral structure such as a guide wire or a support ring. The retention of the elastic force by a peripheral structure, and support structures, may be augmented by at least one static restraint and/or hinge point, for example, at one or more locations on the peripheral structure.

In some examples, a fluid lens includes a membrane, a support structure configured to provide a guide path for an edge portion of the membrane, and a substrate. An example fluid lens may further include a membrane attachment (which may also be termed an interface device) configured to connect the membrane to the support structure and to allow the edge portion of the membrane, such as a control point of the membrane, to move freely along the guide path. A device may include a substrate and an edge seal. In some examples, a fluid lens may include an elastomeric or otherwise deformable element (such as an elastic membrane), a substrate, and a fluid. In some examples, movement of a control point of the membrane (as determined, for example, by the movement of a membrane attachment along a guide path) may be used to adjust the optical properties of a fluid lens.

In some examples, a fluid lens, such as an adjustable fluid lens, includes a pre-strained flexible membrane that at least partially encloses a fluid volume, a fluid enclosed within the fluid volume, a flexible edge seal that may define a periphery of the fluid volume, and an actuation system configured to control the location of an edge of the membrane (e.g., a control point provided by a membrane attachment) such that the optical power of the lens may be modified. The fluid volume may be retained in an enclosure formed at least in part by the membrane, substrate, and the edge seal.

Controlling the edge of the membrane may require energy to deform the membrane and/or energy to deform a peripheral structure such as a support ring or a peripheral guide wire (e.g., in the case of a non-round lens). In some examples, a fluid lens configuration may be configured to reduce the energy required to change the power of the lens to a low value, for example, such that the change in elastic energy stored in the membrane as the lens properties change may be less than the energy required to overcome, for example, frictional forces.

In some examples, an adjustable focus fluid lens includes a substrate and a membrane (e.g., an elastic membrane), where a lens fluid is retained between the membrane and the substrate. The membrane may be under tension, and a mechanical system for applying or retaining the tension in the membrane at sections may be provided along the membrane edge or at portions thereof. The mechanical system may allow the position of the sections to be controllably changed in both height and radial distance. In this context, height may refer to a distance from the substrate, along a direction normal to the local substrate surface. In some examples, height may refer to the distance from a plane extending through the optical center of the lens and perpendicular to the optic axis. Radial distance may refer to a distance from a center of the lens, in some examples, a distance from the optical axis along a direction normal to the optical axis. In some examples, changing the height of at least one of the sections restraining the membrane may cause a change in the membrane's curvature, and the radial distance of the restraint may be changed to reduce increases in the membrane tension.

In some examples, a mechanical system may include a sliding mechanism, a rolling mechanism, a flexure mechanism, an active mechanical system, or a combination thereof. In some examples, a mechanical system may include one or more actuators, and the one or more actuators may be configured to control both (or either of) the height and/or radial distance of one or more of the sections.

An adjustable focus fluid lens may include a substrate, a membrane that is in tension, a fluid, and a peripheral structure restraining the membrane tension, where the peripheral structure extends around a periphery of the membrane, and where, in some examples, the length of the peripheral structure and/or the spatial configuration of the peripheral structure may be controlled. In some examples, the peripheral structure may include an elastic element, allowing the perimeter distance (e.g., circumference) of the membrane to be adjusted, for example, using the membrane attachments. Controlling the circumference of the membrane may controllably maintain the membrane tension when the optical power of the fluid lens is changed.

Changing the optical power of the lens from a first power to a second power may cause a change in membrane tension if the membrane perimeter distance (e.g., circumference) is not changed. However, allowing the membrane perimeter distance (e.g., the distance around the periphery of the membrane) to change may allow the membrane tension to be substantially unchanged, by approximately zero, or by a substantially reduced amount, such as less than +/−1%, 2%, 3%, or 5%. In this example, the +/− aspect may include configurations where a load offset or a negative spring force may be applied to the actuator. In some examples, changes in the membrane tension may remain within at least one of these percentage limits as the fluid lens is adjusted.

A fluid lens may include strain energy, for example, within the elastic membrane. For example, an elastic membrane may have elastic energy (such as strain energy) when the membrane is stretched. In some configurations, work done by an external force, such as provided by an actuator when adjusting the membrane, may increase the strain energy stored within the membrane. However, in some examples, one or more membrane attachments, which may be located within edge portions of the membrane, may be adjusted along a guide path such that the elastic strain energy stored within the membrane may not appreciably change.

A force, such as a force provided by an actuator, may perform work when there is a displacement of the point of application in the direction of the force. In some examples, a fluid lens is configured so that there is no appreciable elastic force in the direction of the guide path. In such configurations, a displacement of the edge portion of the membrane along the guide path does not require work in relation to the elastic force. There may, however, be work required to overcome friction and other relatively minor effects.

In some examples, a fluid lens includes a peripheral structure. A peripheral structure may include a member, such as a support ring or guide wire, affixed to a perimeter of an elastic membrane of a fluid lens. The peripheral structure may be approximately the same shape as the lens. For a circular lens, the peripheral structure may be generally circular. For non-circular lenses, the peripheral structure may bend normally to the plane defined by the membrane for spherical optics. However, a rigid peripheral structure may impose restrictions on the positional adjustment of control points, and in some examples a flexible peripheral structure such as a guide wire may be positioned around the periphery of the membrane, and locations of control points on the flexible peripheral structure may be controlled. Membrane attachments may be attached to the peripheral structure, such as attached to a support ring or guide wire, and movement of the membrane attachments along a guide path may be used to adjust the membrane profile and at least one optical property of the lens, such as focal length. In some examples, one or more actuators may be used to control the surface profile of the membrane, for example, by adjusting a line tension within the membrane, or by moving one or more membrane attachments along a guide path. The membrane may be a distensible membrane, such as an elastic membrane.

In some examples, a membrane may have one or more control points, which may include locations within an edge portion of a membrane (arranged, for example, around a periphery of a membrane) that may be moved. For example, a fluid lens may include a membrane and one or more membrane attachments, that may provide actuation points for the membrane. In some examples, a membrane attachment may move along a guide path in response to elastic forces, and not be an actuation point, and in some examples one or more membrane attachments may be hingedly or pivotally attached to a support structure. In some examples, an actuator may be configured to move at least one control point along a respective guide path to adjust the optical properties of the fluid lens. Control points may be provided by membrane attachments, which may be mechanical components attached to the membrane on which an actuator may exert an actuation force. The actuation force may be used to move the membrane attachment along a guide path, where the guide path is determined by the configuration of a support structure. An example support structure may be attached to the substrate and provide, for example, a surface, slot, groove, or any other suitable mechanical configuration that restricts motion of the membrane attachment to a predetermined guide path.

Figure 6A:
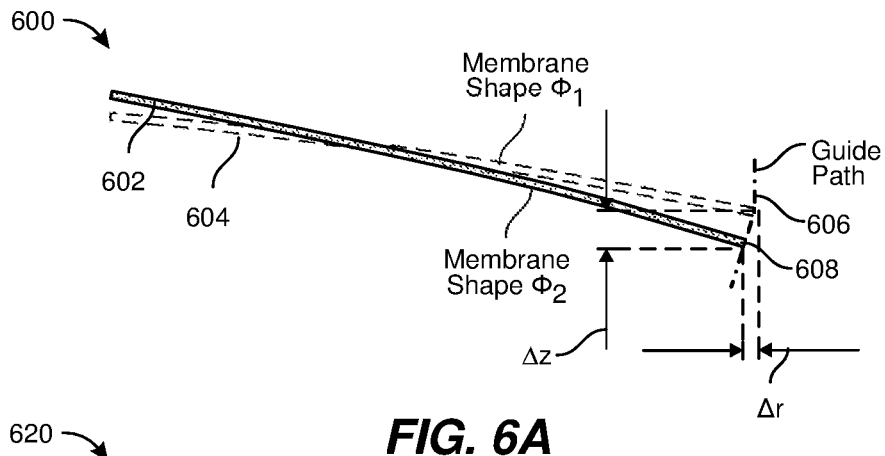
FIGS. 6A-6B illustrate changes in a membrane profile of an example fluid lens, for example, using support structures that provide guide paths, according to some embodiments.

FIG. 6A shows a simplified schematic of an example fluid lens 600, including at least one support structure (not show) that provides a guide path 606 (in this example, a sliding guide path). FIG. 6A shows a membrane having first and second shapes 602 (denoted by solid lines) and 604 (dashed lines), respectively. The membrane shape may also be referred to as a membrane profile. The membrane may be adjusted between the first and second profiles by moving an edge portion of the membrane 608 along the guide path 606. The guide path may be configured so that, as the edge portion of the membrane 608 is moved downwards (e.g., towards the substrate) a distance $\Delta z$, the edge portion of the membrane moves inwards, towards the optical center of the lens, by a distance $\Delta r$. In some examples, the guide path may have a generally curved form in which the edge portion of the membrane may move inwardly towards the optical center, as the edge portion moves towards the substrate (or, as the curvature of the membrane increases).

Figure 6B:
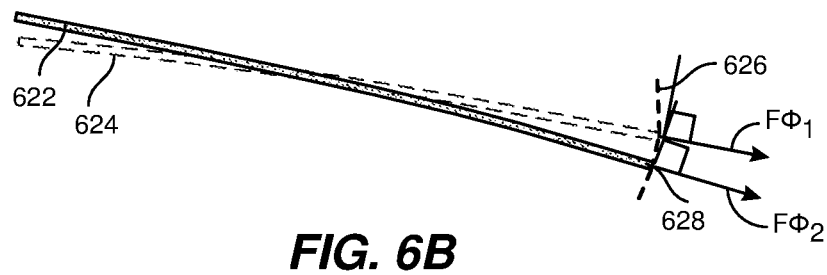

FIG. 6B shows a simplified schematic of an example fluid lens 620, including at least one support structure (not show) that provides a guide path 626. FIG. 6A shows a membrane having first and second shapes 622 (solid lines) and 624 (dashed lines), respectively. The membrane may be adjusted between the first and second shapes by moving an edge portion of the membrane 628 along the guide path 606. The guide path may be configured so the elastic force exerted by the edge portion of the membrane remains normal to the guide path as the edge portion moves along the guide path. In both FIGS. 6A and 6B, the edge portion may correspond to a membrane attachment that is attached to a periphery of the membrane.

The example guide path shown in FIGS. 6A and 6B (and also shown in FIG. 7 below) may be configured so that the strain energy in the membrane is approximately equal for all or most actuation states (e.g., for all or most locations of the membrane attachment along the guide path). Example guide paths may also (or alternatively) be configured so that the force reaction at the membrane edge is normal to the guide path at the location of the control points along the guide path. The elastic force exerted by the membrane on the membrane attachment may be directed in a direction approximately normal to the guide path, at the respective location of the membrane attachment along the guide path.

The figure illustrates guide paths in terms of a parameter $\Delta z$, or "z-displacement" (corresponding to what may be termed a vertical displacement, axial displacement, or height above the substrate) and a parameter $\Delta r$, or "r-displacement", corresponding to what may be termed a radial displacement from the optic axis (that may be determined in a direction normal to the optic axis). The figure illustrates a curved guide path that may be provided by the support structure, which may be used as a guiding device. The radial displacement may be normal to the axial displacement, and the axial displacement may be parallel to the optical axis, in a fluid lens application.

The z-displacement (axial displacement) may be dependent on the frame shape and/or on the edge seal conditions. The r-displacement (radial displacement) may be determined such that the strain energy in the system is at least approximately equal, such as effectively identical, for all states. In this context, a "state" may correspond to an optical property of a fluid lens, such as a focal length, that may be obtained using locations of the membrane control points along a respective guide path.

The fluid lens, in particular the guide path, may be configured so that the angle between the reaction force F between the edge of the membrane and the guiding surface, and the local normal to the guide path provided by the guiding surface, may be approximately zero degrees or a low angle (e.g., less than 5 degrees, and in some examples less than 1 degree).

Typical values of z and r for an approximately one-inch radius round lens are shown below in Table 1.

TABLE 1

| Diopters | Φ | |
|---|---|---|
| | Δr mm | Δz Mm |
| 0.5 | −0.0016 | −0.0224 |
| 2 | −0.0251 | −0.4491 |
| 3.5 | −0.0770 | −0.8746 |

A similar approach may be used for a non-circular lens. The guide path, which may define a trajectory for a control point of the membrane during lens adjustment, may be calculated for every point on the membrane perimeter in a plane which passes through the optical center of the lens.

Figure 7:
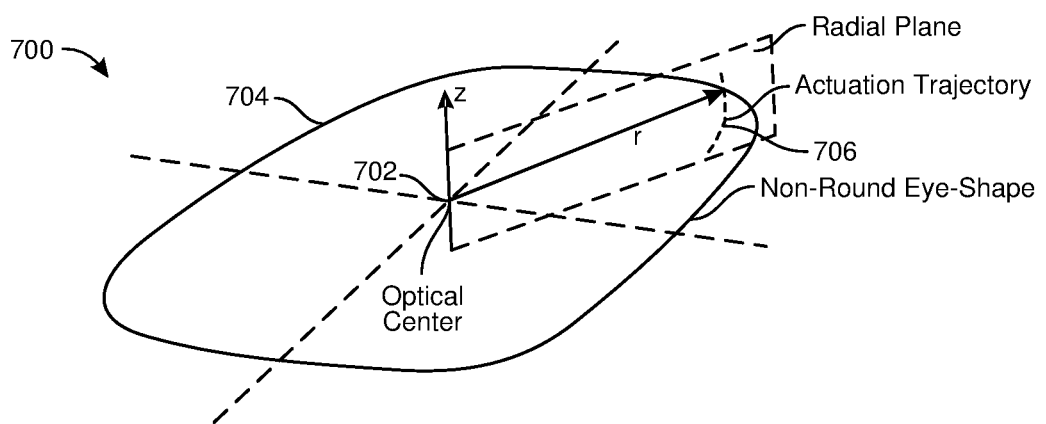
FIG. 7 illustrates an example non-circular fluid lens, including an example guide path, according to some embodiments.

FIG. 7 illustrates an example non-circular fluid lens 700, having an optical center 702, non-circular periphery 704, and an example guide path 706. The guide path may describe the actuation trajectory, for example, of a membrane attachment. The illustrated lens has an optical center 702 through which an optical axis passes, which may be used as the z-axis and may be referred to as the vertical direction or axial direction. The term "vertical" used here is arbitrary and not intended to place any limitation on the lens orientation.

An example "zero-strain" guide path for a control point (e.g., a trajectory allowing appreciable reduction or substantial elimination of elastic energy change in the membrane during lens adjustment), for a non-round lens, is shown below in Table 2.

TABLE 2

| Diopters | Φ | |
|---|---|---|
| | Δr Mm | Δz mm |
| 0.5 | −0.0031 | −0.2443 |
| 2 | −0.0499 | −0.9802 |
| 3.5 | −0.1558 | −1.7278 |

Figure 8:
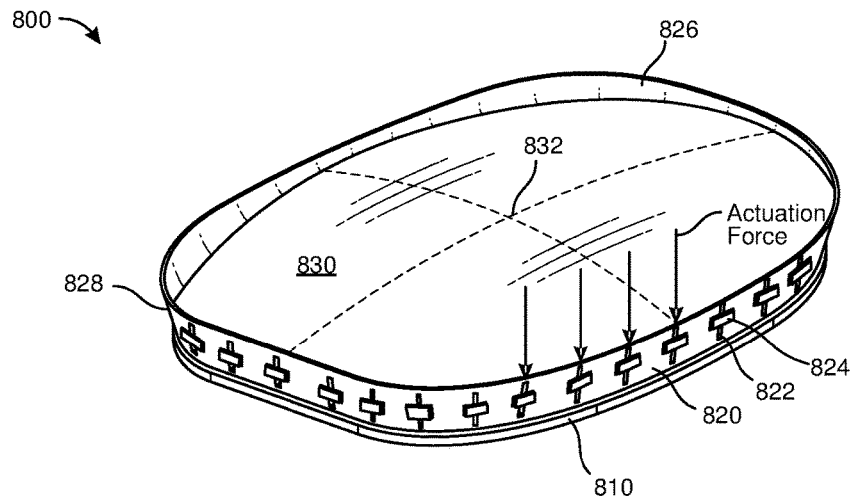
FIG. 8 illustrates an example non-circular fluid lens, including application of actuation forces, according to some embodiments.

FIG. 8 illustrates an example non-circular fluid lens 800, including a substrate 810, a support structure 820 having guide slots 822 formed therein, a membrane 830, and membrane attachments 824 that extend through the guide slots 822. The figure shows application of actuation forces (as generally downwards arrows, but forces may also be directed generally upwards, as illustrated) to each of one or more membrane attachments 824, which in this example provide actuation points for the membrane 830. In this example, the membrane attachments extend through guide slots 822 formed in a support structure 820. The membrane attachments may move within the slot along a guide path, and the shape of the guide path is defined by the exterior surface of the support structure, as seen at 828. The dashed lines crossing at the optical center 832 of the lens provide a visual indication of a convex exterior surface of the membrane 830. The interior of the support structure is visible at 826. In this example, the support structure generally extends around the periphery of the lens. In other examples, a fluid lens may include a plurality of separate support structures arranged around the periphery of the lens. (Terms such as upwards, downwards, vertical, horizontal, and the like, may refer to example illustrated orientations, and are not limiting.)

The guide path may be configured so that the elastic energy within the membrane is not changed as the membrane attachments are moved along the guide paths. Using this approach, the actuation force may be very low, and may be approximately zero, as related to changes in the strain energy of the membrane. In some examples, a relatively low actuation force may be used to overcome frictional forces and the like. The actuation force may be positive or negative at any of the control point locations.

In some examples, a guide path may be provided by a support structure including one or more of the following: a pivot, a flexure; a slide, a guide slot, a guide surface, a guide channel, or any other suitable mechanism. A support structure may be entirely outside the fluid volume, entirely inside the fluid volume, or partially within the fluid volume.

FIG. 9 illustrates a comparison of the force required to axially actuate a non-round lens using axial actuation and a "zero-strain" configuration. In this comparison, friction is neglected. In this graph, the actuation force required by the zero-strain configuration lens is the line having values of approximately zero N/mm for all angles shown. The axial actuation force curve is the lower curve, having values around 0.04 N/mm. For a zero-strain lens, the force required for actuation may be dominated by the friction in the guidance system. This may be dependent on the guidance structure used. The figure illustrates the dramatic reduction in actuation force required for a zero-strain lens.

An advantage of the "zero-strain" approach (where the actuation force is greatly reduced and may be mostly force required to overcome friction) is that a lens may be actuated into a particular configuration (such as a particular optical power) and the membrane may then tend to remain in that particular configuration, which may be neutrally stable. This may greatly reduce actuation power requirements, as no appreciable force may be needed to hold the lens in any particular configuration.

An example method of operating a device, such as a device having a fluid lens, may include providing a fluid lens having a membrane, a substrate, and a fluid located within an enclosure formed at least in part by the membrane and the substrate. The membrane may be an elastic membrane, and may have a profile, such as a curved profile, within the fluid lens.

FIG. 10 shows an example method of operating a device, such as a device including a fluid lens. The example method 1000 includes providing a fluid lens including a membrane (1010), such as an elastic membrane, applying an actuation force to a membrane attachment (1020) in order to adjust the location of the membrane attachment and moving the membrane attachment along a guide path so that the elastic energy within the membrane is substantially unchanged (1030). The guide path may be determined by a support structure, for example, by the configuration of a slot or any other suitable guide surface or configuration.

FIG. 11 shows an example method of operating a device. The example method 1100 includes providing a fluid lens including a membrane (1110), such as an elastic membrane, applying an actuation force to a membrane attachment (1120) in order to adjust the location of the membrane attachment, and moving the membrane attachment along a guide path (1130) so that the elastic force acting on the membrane attachment, by the membrane, remains generally normal to the direction of movement of the membrane attachment. In some examples, the elastic energy within the membrane may be substantially unchanged as well. The guide path may be determined by a support structure, for example, by the configuration of a slot, or any other suitable guide surface or other suitable structure.

In some examples (e.g., related to the approaches described above in relation to FIG. 10 or 11), the support structure may be attached to a substrate and fluid may be enclosed at least in part by the membrane and the substrate. The membrane attachment may be located proximate a periphery of the membrane, and movement of the membrane attachment may adjust the profile of the membrane, and hence an optical property of the fluid lens.

FIG. 12 shows an example method of fabricating a device, such as a device including a fluid lens. The example method 1200 includes providing a substrate (1210), attaching a membrane to the substrate using a support structure (1220), where the support structure is configured to provide a guide path for a membrane attachment, and introducing a fluid into a enclosure formed at least in part by the substrate and the membrane (1230). The support structure may be configured so that the membrane attachment moves along the guide path during adjustment of the fluid lens. The guide path may be configured so that the elastic force acting on the membrane attachment remains generally perpendicular to the local direction of movement of the membrane attachment, and/or the elastic energy stored within the membrane (e.g., an elastic membrane) is generally independent of the location of the membrane attachment on the guide path.

In some examples, a fluid lens (which may also be termed a fluid-filled lens) may include a relatively rigid substrate and a flexible polymer membrane. The control points may be provided by membrane attachments, which may be attached to the membrane or a peripheral structure and may interact with a corresponding support structure that provides a guide path. For example, the membrane may be attached to at least one support structure at control points disposed around the membrane periphery. A flexible edge seal may be used to enclose the fluid. The lens power can be adjusted by moving the location of control points along guide paths, for example, using one more actuators. Guide paths (which may correspond to reduced work trajectories of the control points) may be determined that maintain a constant elastic deformation energy of the membrane as the control point location is moved along the guide path.

Guide devices may be attached to (or formed as part of) the substrate. Sources of elastic energy include hoop stress (tension in azimuth) and line strain, and elastic energy may be exchanged between these as the membrane is adjusted. Example "zero-strain" guide paths may greatly reduce or substantially eliminate the energy required for lens adjustment. In some examples, the force direction used to adjust the control point location may be normal to the elastic force on the support structure from the membrane. There are great possible advantages to this approach, including much reduced actuator size and power requirements and a faster lens response that may be restricted only by viscous and friction effects.

In the analysis used to determine the guide path, the fluid may be assumed to be incompressible so that the fluid volume does not change. A zero-strain guide path may be readily determined for a circular lens. The analysis for non-circular lenses may be slightly different, and in some cases the work required for adjustment may be reduced but not entirely eliminated. An example simplified approach determines a guide path for which there is no elastic force component in the guide direction, so that the force direction used to adjust the control point location is normal to the elastic force on the support structure from the membrane.

In some examples, a liquid lens may be adjusted by moving each control point of an elastic membrane along a guide path, which may be determined so that the elastic deformation energy of the membrane is substantially unchanged by the adjustment. This may allow for greatly reduced actuation power and a faster response. An example approach uses a guide wire, such as a steel wire with an optional thermoplastic polyurethane (TPU) coating, positioned along the perimeter of the membrane. If the perimeter distance is reduced, the control points of the membrane may move along the guide path towards the substrate.

In some examples, a device may include at least one of the following: a clevis fastener or at least one roller, for example, using jewel (e.g., sapphire) wheels; optional surface treatments to reduce friction; or flanges to guide the control points along the guide path, such as provided by a guide slot. The number of control points may be selected based on various factors, for example, the degree of "scalloping" (curved edges) between control points. In some examples, the scalloped regions may be hidden by eyeglass frames. In some examples, an additional spring (or foam) element may be used to correct the position of the guide wire with respect to the substrate. Numerical modeling with 20 control points demonstrate relative optical performance, though other numbers of control points may be used, such as 5-30, 10-30, etc. Fabrication examples may include attaching the guide wire to the membrane using acoustic welding, optionally followed by laser trimming.

In some examples, at least one optical parameter of a fluid lens may be determined at least in part by a physical profile of a membrane. In some examples, a fluid lens may be configured so that at least one optical parameter of the lens may be adjusted without changing the elastic strain energy in the membrane. In some examples, at least one optical parameter of the lens may be adjusted using an adjustment force, for example, a force applied by an actuator, that is normal to a direction of an elastic strain force in the membrane (e.g., at the periphery of the membrane). In some examples, a guide path may be configured so that the adjustment force is always at least approximately normal to the elastic strain force during adjustment of the fluid lens. For example, the angle between the adjustment force and the elastic strain force may be within 5 degrees of normal, for example, within 3 degrees of normal.

Example applications of the principles described herein include a device including a deformable element such as a membrane (where the deformable element may be in elastic tension), a substrate, a fluid at least partially enclosed between the membrane and the substrate, and a support structure configured to provide a guide path for an edge portion of the deformable element. The guide path may be configured such that adjustment of the device changes a profile of the deformable element without changing an elastic strain energy within the deformable element. The guide path may be configured such that adjustment of the device changes a profile of the deformable element by applying an actuation force normal to an elastic strain force in the deformable element.

In some examples, a device, such as an adjustable fluid lens, includes a membrane in elastic tension, a substrate, a fluid at least partially enclosed between the membrane and the substrate, and a support structure configured to provide a guide path for an edge portion of the membrane. The guide path may be configured so that there is approximately no change in the total strain energy in the membrane as the edge portion of the membrane moves along the guide path.

In some examples, the optical power of the fluid lens may be adjustable by moving a location of the edge portion of the membrane along the guide path. The device may further include at least one actuator configured to adjust the location of respective one or more edge portions of the membrane. The elastic energy may be substantially independent of the location of the edge portion along the guide path. In some examples, the guide path may be configured so that the elastic tension is directed along a normal to the local direction of the guide path for each location on the guide path.

In some examples, a device includes a fluid lens having an optical center, where locations on the guide path have a radial distance from the optical center and an axial displacement from the substrate. The guide path may be configured such that the radial distance decreases as the axial displacement (or vertical distance) decreases. The guide path may be configured such that the guide path curves inwardly towards the optical center as the axial displacement decreases. In some examples, the elastic tension may have no appreciable component directed tangentially along the guide path. A device may further include a membrane attachment (that may also be termed an interface device) that connects the membrane to the support structure and may allow the membrane to move freely along the guide path. A support structure may include at least one of a pivot, a flexure, a slide, a guide slot, a guide channel, or a guide surface.

In some examples, a device may further include an edge seal configured to help retain the fluid between the substrate and the membrane. The edge seal may be connected to the substrate and the membrane, and may be flexible to allow movement of the peripheral region of the membrane. A device may include a plurality of support structures, with each support structure mechanically interacting with a respective membrane attachment.

In some examples, a device includes a fluid lens having a deformable element such as a membrane (where the deformable element may be in elastic tension), a substrate, a fluid at least partially enclosed between the membrane and the substrate, and a support structure configured to provide a guide path for an edge portion of the deformable element, such as a membrane attachment attached to a periphery of a membrane. The guide path may be configured such that adjustment of the device changes a profile of the deformable element without appreciably changing an elastic strain energy within the deformable element. The guide path may be configured such that adjustment of the device changes a profile of the deformable element by applying an actuation force normal to an elastic force exerted by the deformable element.

In some examples, a method of adjusting a fluid lens (e.g., including a membrane such as an elastomer polymer membrane) includes adjusting a respective position of one or more control points such that the optical power of the fluid lens changes while the elastic strain energy in the elastomer polymer membrane does not change appreciably. An example method may further include applying an actuation force to the membrane to change the optical power of the fluid lens, where the actuation force is applied in a direction normal to an elastic strain force within the membrane. The actuation force may move a control point of the membrane along a guide path, and the control point may be located within an edge portion of the membrane. A control point may be provided by a membrane attachment that mechanically interacts with a support structure attached to the substrate. In some examples, the control point may be taken to be a central portion of a membrane attachment where it is attached to an edge portion of the membrane.

Example embodiments include apparatus, systems, and methods related to fluid lenses. In some examples, the term "fluid lens" may include adjustable fluid-filled lenses, such as adjustable liquid-filled lenses.

In some examples, a fluid lens may include a membrane, a substrate, such as a rigid substrate having a substrate surface, and a fluid located within an enclosure formed at least in part by the membrane and the substrate. The membrane may be an elastic membrane having a membrane profile. The fluid lens may have an optical property that is adjustable by adjusting the membrane profile, for example, by modifying a curvature of the membrane profile. A fluid lens may further include a support structure configured to retain the membrane under tension and allow adjustment of the optical property of the fluid lens by adjusting the membrane profile.

In some examples, a fluid lens includes a substrate (such as a planar substrate, that may be generally rigid), a membrane, which may provide a curved or planar surface, an edge seal, and a support structure. A fluid lens may be a circular lens or non-circular lens. The edge seal may extend around the periphery of a fluid-filled volume and retain (in cooperation with the substrate and the membrane) the fluid within an enclosed fluid volume. The fluid may be enclosed by the substrate and membrane in cooperation with the edge seal. The support structure may provide a guide surface, and may include a guide slot or any other suitable guide structure. An example support structure may include an element that extends around the periphery (or within a peripheral region) of the substrate and attach the membrane to the substrate. The support structure may provide a guide path, such as a guide surface along which a control point (e.g., provided by a membrane attachment located within an edge portion of the membrane) may slide. The support structure may include at least one actuator, and the fluid lens may include one or more actuators which may be located around the periphery of the fluid lens. The at least one actuator may exert a controllable force on the membrane through at least one control point, and may be used to adjust the curvature of the membrane surface and hence the optical properties of the lens (such as focal length, astigmatism correction, cylindricity, parabolic or freeform surface profiles, pincushion distortion, barrel distortion, or any other relevant optical parameter).

In some examples, an ophthalmic application of a fluid lens includes a lens frame, an elastic membrane, a substrate, a lens fluid (that may be at least partially enclosed between the elastic membrane and the substrate), an edge seal, and at least one support structure. The substrate may include a generally planar, rigid layer, and may be generally optically transparent. Adjustment of the device configuration and forces applied to the membrane may achieve a planar-convex fluid lens, in which the membrane tends to curve away from the substrate within a central portion. Example lenses may also be configured in planar-concave configurations, in which the membrane tends to curve towards the substrate in a central portion. In some examples, an adjustable fluid lens includes a membrane having a line tension, a peripheral structure (such as a guide wire or support ring) extending around the membrane periphery, a substrate, and an edge seal. The membrane line tension may be supported by the peripheral structure. This may be augmented by a static restraint located at one or more points on the peripheral structure.

In some examples, a peripheral structure may generally surround the fluid lens, and the fluid may be enclosed by the combination of the substrate, the membrane, and the edge seal. However, a rigid peripheral structure, such as a rigid support ring, may limit adjustments available to the control points of the membrane. In some examples, a deformable or flexible peripheral structure may be used, such as a peripheral structure including a guide wire.

In some examples, a device includes a membrane, a support structure configured to provide a guide path for an edge portion of the membrane, a membrane attachment (which mechanically connects the membrane to the support structure and allows a control point of the membrane to move freely along the guide path), a substrate, and an edge seal. In some examples, the support structure may be generally rigid and attached to the substrate, and/or to a frame.

Lens Fluid

In some examples, a fluid lens (which may also be termed a "fluid-filled lens") includes a fluid, a substrate, and a membrane, with the substrate and the membrane at least partially enclosing the fluid. The fluid within a fluid lens may be referred to as a "lens fluid" or occasionally as a "fluid" for conciseness. The lens fluid may include a liquid, such as an oil, such as a silicone oil, such as a phenylated silicone oil.

In some examples, a lens fluid may be (or include) a transparent fluid. In this context, a transparent fluid may have little or substantially no visually perceptible visible wavelength absorption over an operational wavelength range. However, fluid lenses may also be used in the UV and the IR spectrum, and in some examples the fluid used may be generally non-absorbing in the wavelength range of the desired application and may not be transparent over some or all of the visible wavelength range. In some examples, the membrane may be transparent, for example, optically clear at visible wavelengths.

In some examples, a lens fluid may include an oil, such as an optical oil. In some examples, a lens fluid may include one or more of a silicone, a thiol, or a cyano compound. The fluid may include a silicone based fluid, which may sometimes be referred to as a silicone oil. Example lens fluids include aromatic silicones, such as phenylated siloxanes, for example, pentaphenyl trimethyl trisiloxane.

In some examples, a fluid lens includes, for example, a membrane at least partially enclosing a fluid. A fluid may be, or include, one or more of the following: a gas, gel, liquid, suspension, emulsion, vesicle, micelle, colloid, liquid crystal, or any other suitable flowable or otherwise deformable phase.

In some examples, a lens fluid may have a visually perceptible color or absorption, for example, for eye protection use or improvement in visual acuity. In some examples, the lens fluid may have a UV absorbing dye and/or a blue absorbing dye, and the fluid lens may have a slightly yellowish tint. In some examples, a lens fluid may include a dye selected to absorb specific wavelengths, for example, laser wavelengths in the example of laser goggles.

In some examples, a device including a fluid lens may be configured as sunglasses, and the lens fluid may include an optical absorber and/or photochromic material. In some examples, a fluid lens may include a separate layer, such as a light absorption layer configured to reduce the light intensity passed to the eye, or protect the eye against specific wavelengths or wavelength bands.

Polymer Membranes

In some examples, an example fluid lens may include a membrane. A membrane may include a thin polymer film, which may have a thickness much less (e.g., more than an order of magnitude less) than the lens radius or other lateral extent of the lens. The membrane may provide a deformable optical surface of an adjustable fluid lens.

A fluid lens may include a deformable element such as a polymer membrane, or any other suitable deformable element. A polymer membrane may include an elastomer polymer, and may be an elastic membrane. Membrane thicknesses may be in the range 10 microns-1 mm, for example, between 100 microns and 500 microns. The membrane may be optically clear.

In some applications, a fluid lens may show gravity sag, which is a typically undesired variation of optical power with height due to a hydrostatic pressure gradient in the fluid lens. Gravity sag may be expressed as change in optical power with height, for example, 0.25 diopters (D) over a vertical displacement of 20 mm. In some examples, a membrane coating may modify the elastic properties of a membrane in such a way that gravity sag is reduced or substantially eliminated. In some examples, a membrane may have a tension sufficient to keep gravity sag to within a desired limit. For example, a membrane may have a tension in the range 100 N/m to 500 N/m, for instance within the range 200 N/m to 300 N/m.

In some examples, a membrane and/or a substrate may be subject to a surface treatment, such as a coating, which may be provided before or after fluid lens assembly. In some examples, a polymer may be applied to the membrane, such as a polymer coating, for example, a fluoropolymer coating. A fluoropolymer coating may include one or more fluoropolymers, such as polytetrafluoroethylene, or its analogs, blends, or derivatives.

Substrates

In some examples, a fluid lens may include a substrate. The substrate may provide one exterior surface of an adjustable fluid lens, for example, opposite the surface provided by the membrane, and may include a rigid layer or a rigid lens.

In some examples, the substrate may be relatively rigid, and may exhibit no visually perceptible deformation due to, for example, adjusting the internal pressure of the fluid and/or tension on the membrane. In some examples, the substrate may be a generally transparent planar sheet. The substrate may include one more substrate layers, and a substrate layer may include a polymer, glass, optical film, or the like. Example glasses include silicate glasses, such as borosilicate glasses. In some examples, one or both surfaces of a substrate may be planar, spherical, cylindrical, spherocylindrical, convex, concave, parabolic, or have a freeform surface curvature. One or both surfaces of a substrate may approximate a prescription of a user, and adjustment of the membrane profile may be used to provide an improved prescription, for example, for reading, distance viewing, or any other desired use. In some examples, the substrate may have no significant optical power, for example, by having parallel planar surfaces.

Membrane deformation may be used to adjust an optical parameter, such as a focal length, around a center value determined by relatively fixed surface curvature(s) of a substrate or other optical element, for example, of one or both surfaces of a substrate.

In some examples, the substrate may include an elastomer, and may in some examples have an adjustable profile (that may have a smaller range of adjustments than provided by the membrane), and in some examples the substrate may be omitted and the fluid enclosed by a pair of membranes, or any other suitable flexible enclosure configuration. An example lens may include a pair of membranes at least partially enclosing the lens fluid, and a rigid substrate may be omitted.

Edge Seal

In some examples, a fluid lens may include an edge seal, that may include, for example, a deformable component configured to retain the fluid in the lens. The edge seal may connect an edge portion of the membrane to an edge portion of the substrate, and may include a thin flexible polymer film. In some examples, the fluid may be enclosed in a flexible bag, which may provide the edge seal, membrane, and in some examples, a substrate coating. An edge seal may include a flexible polymer film.

Actuators

In some examples, a fluid lens includes one or more actuators. The one or more actuators may be used to modify the elastic tension of a membrane, and may hence modify an optical parameter of a fluid lens including the membrane. The membrane may be connected to a substrate around the periphery of the membrane, for example, using a connection assembly. The connection assembly may include at least one of an actuator, a post, a wire, or any other suitable connection hardware. In some examples, one or more actuators are used to adjust the curvature of the membrane, and hence the optical properties of the fluid lens.

Devices, Such as Ophthalmic Devices with Frames

In some examples, a device including a fluid lens may include a one or more fluid lenses supported by a frame, such as ophthalmic glasses, goggles, visor, or the like. Example fluid lenses may be shaped and sized for use in glasses (e.g., prescription spectacles) or head-mounted displays such as virtual reality devices or augmented reality devices. Example lenses may be the primary viewing lenses of such devices.

Applications of the concepts described herein include fluid lenses and devices that may include one or more fluid lenses, such as ophthalmic devices (e.g., glasses), augmented reality devices, virtual reality devices, and the like. Fluid lenses may be incorporated into eyewear, such as wearable optical devices like eyeglasses, an augmented reality or virtual reality headset, and/or other wearable optical device. Due to these principles described herein, these devices may exhibit reduced thickness, reduced weight, improved wide-angle/field-of-view optics (e.g., for a given weight), and/or improved aesthetics. Examples include devices including one or more lenses shaped and sized for use in glasses, heads-up displays, augmented reality devices, virtual reality devices, and the like. In some examples, a fluid lens may be a primary viewing lens for the device, for example, a lens through which light from the environment passes before reaching the eye of a user. In some examples, a fluid lens may have a diameter or other analogous dimension (e.g., width or height of a non-circular lens) that is between 20 mm and 80 mm.

Coatings

In some examples, a substrate may include a coating. In some examples, an interior and/or exterior surface of a substrate and/or membrane may have a coating, such as a polymer coating. In some examples, an exterior surface of a substrate may have a scratch-resistant coating and/or an antireflection coating. In some examples, an interior surface may correspond to an interior surface of an enclosure holding the lens fluid, such as a surface of a membrane or substrate adjacent or substantially adjacent to the lens fluid.

Embodiments of the present disclosure may include or be implemented in conjunction with various types of artificial reality systems. Artificial reality is a form of reality that has been adjusted in some manner before presentation to a user, that may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of that may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial reality systems may be designed to work without near-eye displays (NEDs). Other artificial reality systems may include an NED that also provides visibility into the real world (e.g., augmented-reality system 1300 in FIG. 13) or that visually immerses a user in an artificial reality (e.g., virtual-reality system 1400 in FIG. 14). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Turning to FIG. 13, augmented-reality system 1300 may include an eyewear device 1302 with a frame 1310 configured to hold a left display device 1315(A) and a right display device 1315(B) in front of a user's eyes. Display devices 1315(A) and 1315(B) may act together or independently to present an image or series of images to a user. While augmented-reality system 1300 includes two displays, embodiments of this disclosure may be implemented in augmented-reality systems with a single NED or more than two NEDs.

In some embodiments, augmented-reality system 1300 may include one or more sensors, such as sensor 1340. Sensor 1340 may generate measurement signals in response to motion of augmented-reality system 1300 and may be located on substantially any portion of frame 1310. Sensor 1340 may represent a position sensor, an inertial measurement unit (IMU), a depth camera assembly, a structured light emitter and/or detector, or any combination thereof. In some embodiments, augmented-reality system 1300 may or may not include sensor 1340 or may include more than one sensor. In embodiments in which sensor 1340 includes an IMU, the IMU may generate calibration data based on measurement signals from sensor 1340. Examples of sensor 1340 may include, without limitation, accelerometers, gyroscopes, magnetometers, other suitable types of sensors that detect motion, sensors used for error correction of the IMU, or some combination thereof.

Augmented-reality system 1300 may also include a microphone array with a plurality of acoustic transducers 1320(A)-1320(J), referred to collectively as acoustic transducers 1320. Acoustic transducers 1320 may be transducers that detect air pressure variations induced by sound waves. Each acoustic transducer 1320 may be configured to detect sound and convert the detected sound into an electronic format (e.g., an analog or digital format). The microphone array in FIG. 2 may include, for example, ten acoustic transducers: 1320(A) and 1320(B), that may be designed to be placed inside a corresponding ear of the user, acoustic transducers 1320(C), 1320(D), 1320(E), 1320(F), 1320(G), and 1320(H), that may be positioned at various locations on frame 1310, and/or acoustic transducers 1320(I) and 1320 (J), that may be positioned on a corresponding neckband 1305.

In some embodiments, one or more of acoustic transducers 1320(A)-(F) may be used as output transducers (e.g., speakers). For example, acoustic transducers 1320(A) and/or 1320(B) may be earbuds or any other suitable type of headphone or speaker.

The configuration of acoustic transducers 1320 of the microphone array may vary. While augmented-reality system 1300 is shown in FIG. 13 as having ten acoustic transducers 1320, the number of acoustic transducers 1320 may be greater or less than ten. In some embodiments, using higher numbers of acoustic transducers 1320 may increase the amount of audio information collected and/or the sensitivity and accuracy of the audio information. In contrast, using a lower number of acoustic transducers 1320 may decrease the computing power required by an associated controller 1350 to process the collected audio information. In addition, the position of each acoustic transducer 1320 of the microphone array may vary. For example, the position of an acoustic transducer 1320 may include a defined position on the user, a defined coordinate on frame 1310, an orientation associated with each acoustic transducer 1320, or some combination thereof.

Acoustic transducers 1320(A) and 1320(B) may be positioned on different parts of the user's ear, such as behind the pinna, behind the tragus, and/or within the auricle or fossa. Or, there may be additional acoustic transducers 1320 on or surrounding the ear in addition to acoustic transducers 1320 inside the ear canal. Having an acoustic transducer 1320 positioned next to an ear canal of a user may enable the microphone array to collect information on how sounds arrive at the ear canal. By positioning at least two of acoustic transducers 1320 on either side of a user's head (e.g., as binaural microphones), augmented-reality system 1300 may simulate binaural hearing and capture a 3D stereo sound field around about a user's head. In some embodiments, acoustic transducers 1320(A) and 1320(B) may be connected to augmented-reality system 1300 via a wired connection 1330, and in other embodiments acoustic transducers 1320(A) and 1320(B) may be connected to augmented-reality system 1300 via a wireless connection (e.g., a Bluetooth connection). In still other embodiments, acoustic transducers 1320(A) and 1320(B) may not be used at all in conjunction with augmented-reality system 1300.

Acoustic transducers 1320 on frame 1310 may be positioned along the length of the temples, across the bridge, above or below display devices 1315(A) and 1315(B), or some combination thereof. Acoustic transducers 1320 may be oriented such that the microphone array is able to detect sounds in a wide range of directions surrounding the user wearing the augmented-reality system 1300. In some embodiments, an optimization process may be performed during manufacturing of augmented-reality system 1300 to determine relative positioning of each acoustic transducer 1320 in the microphone array.

In some examples, augmented-reality system 1300 may include or be connected to an external device (e.g., a paired device), such as neckband 1305. Neckband 1305 generally represents any type or form of paired device. Thus, the following discussion of neckband 1305 may also apply to various other paired devices, such as charging cases, smart watches, smart phones, wrist bands, other wearable devices, hand-held controllers, tablet computers, laptop computers, other external compute devices, etc.

As shown, neckband 1305 may be coupled to eyewear device 1302 via one or more connectors. The connectors may be wired or wireless and may include electrical and/or non-electrical (e.g., structural) components. In some cases, eyewear device 1302 and neckband 1305 may operate independently without any wired or wireless connection between them. While FIG. 13 illustrates the components of eyewear device 1302 and neckband 1305 in example locations on eyewear device 1302 and neckband 1305, the components may be located elsewhere and/or distributed differently on eyewear device 1302 and/or neckband 1305. In some embodiments, the components of eyewear device 1302 and neckband 1305 may be located on one or more additional peripheral devices paired with eyewear device 1302, neckband 1305, or some combination thereof.

Pairing external devices, such as neckband 1305, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1300 may be provided by a paired device or shared between a paired device and an eyewear device, thus reducing the weight, heat profile, and form factor of the eyewear device overall while still retaining desired functionality. For example, neckband 1305 may allow components that would otherwise be included on an eyewear device to be included in neckband 1305 since users may tolerate a heavier weight load on their shoulders than they would tolerate on their heads. Neckband 1305 may also have a larger surface area over which to diffuse and disperse heat to the ambient environment. Thus, neckband 1305 may allow for greater battery and computation capacity than might otherwise have been possible on a stand-alone eyewear device. Since weight carried in neckband 1305 may be less invasive to a user than weight carried in eyewear device 1302, a user may tolerate wearing a lighter eyewear device and carrying or wearing the paired device for greater lengths of time than a user would tolerate wearing a heavy stand-alone eyewear device, thereby enabling users to more fully incorporate artificial reality environments into their day-to-day activities.

Neckband 1305 may be communicatively coupled with eyewear device 1302 and/or to other devices. These other devices may provide certain functions (e.g., tracking, localizing, depth mapping, processing, storage, etc.) to augmented-reality system 1300. In the embodiment of FIG. 13, neckband 1305 may include two acoustic transducers (e.g., 1320(1) and 1320(J)) that are part of the microphone array (or potentially form their own microphone subarray). Neckband 1305 may also include a controller 1325 and a power source 1335.

Acoustic transducers 1320(1) and 1320(J) of neckband 1305 may be configured to detect sound and convert the detected sound into an electronic format (analog or digital). In the embodiment of FIG. 13, acoustic transducers 1320(1) and 1320(J) may be positioned on neckband 1305, thereby increasing the distance between the neckband acoustic transducers 1320(1) and 1320(J) and other acoustic transducers 1320 positioned on eyewear device 1302. In some cases, increasing the distance between acoustic transducers 1320 of the microphone array may improve the accuracy of beamforming performed via the microphone array. For example, if a sound is detected by acoustic transducers 1320(C) and 1320(D) and the distance between acoustic transducers 1320(C) and 1320(D) is greater than, for example, the distance between acoustic transducers 1320(D) and 1320(E), the determined source location of the detected sound may be more accurate than if the sound had been detected by acoustic transducers 1320(D) and 1320(E).

Controller 1325 of neckband 1305 may process information generated by the sensors on neckband 1305 and/or augmented-reality system 1300. For example, controller 1325 may process information from the microphone array that describes sounds detected by the microphone array. For each detected sound, controller 1325 may perform a direction-of-arrival (DOA) estimation to estimate a direction from which the detected sound arrived at the microphone array. As the microphone array detects sounds, controller 1325 may populate an audio data set with the information. In embodiments in which augmented-reality system 1300 includes an inertial measurement unit, controller 1325 may compute all inertial and spatial calculations from the IMU located on eyewear device 1302. A connector may convey information between augmented-reality system 1300 and neckband 1305 and between augmented-reality system 1300 and controller 1325. The information may be in the form of optical data, electrical data, wireless data, or any other transmittable data form. Moving the processing of information generated by augmented-reality system 1300 to neckband 1305 may reduce weight and heat in eyewear device 1302, making it more comfortable to the user.

Power source 1335 in neckband 1305 may provide power to eyewear device 1302 and/or to neckband 1305. Power source 1335 may include, without limitation, lithium ion batteries, lithium-polymer batteries, primary lithium batteries, alkaline batteries, or any other form of power storage. In some cases, power source 1335 may be a wired power source. Including power source 1335 on neckband 1305 instead of on eyewear device 1302 may help better distribute the weight and heat generated by power source 1335.

As noted, some artificial reality systems may, instead of blending an artificial reality with actual reality, substantially replace one or more of a user's sensory perceptions of the real world with a virtual experience. One example of this type of system is a head-worn display system, such as virtual-reality system 1400 in FIG. 14, that mostly or completely covers a user's field of view. Virtual-reality system 1400 may include a front rigid body 1402 and a band 1404 shaped to fit around a user's head. Virtual-reality system 1400 may also include output audio transducers 1406(A) and 1406(B). Furthermore, while not shown in FIG. 14, front rigid body 1402 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 1300 and/or virtual-reality system 1400 may include one or more liquid crystal displays (LCDs), light emitting diode (LED) displays, organic LED (OLED) displays digital light project (DLP) micro-displays, liquid crystal on silicon (LCoS) micro-displays, and/or any other suitable type of display screen. Artificial reality systems may include a single display screen for both eyes or may provide a display screen for each eye, that may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay light (to, e.g., the viewer's eyes). These optical subsystems may be used in a non-pupil-forming architecture (such as a single lens configuration that directly collimates light but may result in so-called pincushion distortion) and/or a pupil-forming architecture (such as a multi-lens configuration that may produce barrel distortion to nullify pincushion distortion).

In addition to or instead of using display screens, some artificial reality systems may include one or more projection systems. For example, display devices in augmented-reality system 1300 and/or virtual-reality system 1400 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. The display devices may accomplish this using any of a variety of different optical components, including waveguides components (e.g., holographic, planar, diffractive, polarized, and/or reflective waveguide elements), light-manipulation surfaces and elements (such as diffractive, reflective, and refractive elements and gratings), coupling elements, etc. Artificial reality systems may also be configured with any other suitable type or form of image projection system, such as retinal projectors used in virtual retina displays.

Artificial reality systems may also include various types of computer vision components and subsystems. For example, augmented-reality system 1300 and/or virtual-reality system 1400 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. For example, elements 1406(A), and 1406(B) may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some examples, artificial reality systems may include tactile (i.e., haptic) feedback systems, that may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

Example Embodiments

Example 1

A device may include a fluid lens, wherein the fluid lens includes a membrane having a membrane profile, a membrane attachment attached to a peripheral portion of the membrane, a substrate, a fluid located within an enclosure formed at least in part by the membrane and the substrate, and a support structure configured to enable adjustment of the membrane profile, where the support structure engages with the membrane attachment and allows movement of the membrane attachment along a guide path to provide the adjustment of the membrane profile, a focal length of the fluid lens is changed by the adjustment of the membrane profile, and the adjustment of the membrane profile does not result in an appreciable change in an elastic energy of the membrane.

Example 2

The device of example 1, further including an actuator configured to adjust the position of the membrane attachment along the guide path.

Example 3

The device of any of examples 1 and 2, where the elastic energy of the membrane is substantially independent of the location of the membrane attachment on the guide path.

Example 4

The device of any of examples 1-3, where the membrane attachment exerts an elastic force on the support structure, and the guide path is configured so that the elastic force is generally normal to the guide path for each location on the guide path.

Example 5

The device of any of examples 1-4, where the elastic force has no appreciable component tangential to the guide path.

Example 6

The device of any of examples 1-5, where the fluid lens has an optical axis, locations on the guide path have a radial distance from an optical center of the fluid lens and an axial displacement from the substrate, and the radial distance increases as the axial displacement increases.

Example 7

The device of any of examples 1-6, where the guide path curves inwardly towards an optical center of the fluid lens as the membrane attachment approaches the substrate.

Example 8

The device of any of examples 1-7, where the support structure includes at least one of a pivot, a flexure, a slide, a guide slot, a guide channel, or a guide surface.

Example 9

The device of any of examples 1-8, further including an edge seal, where the edge seal is configured to retain the fluid between the substrate and the membrane.

Example 10

The device of any of examples 1-9, where the device includes a plurality of support structures that include the support structure, where each support structure is configured to engage with a respective membrane attachment.

Example 11

The device of any of examples 1-10, where the substrate is a planar substrate.

Example 12

The device of any of examples 1-11, where the fluid is a liquid, and the fluid lens is an adjustable liquid lens.

Example 13

The device of any of examples 1-12, where the device is a head-mounted device.

Example 14

The device of any of examples 1-13, where the device includes a frame that supports both the fluid lens and an additional fluid lens.

Example 15

The device of any of examples 1-14, where the device is an ophthalmic device configured to be used as eyewear.

Example 16

The device of any of examples 1-15, where the device is an augmented reality device or a virtual reality device.

Example 17

A method may include: providing a fluid lens including a substrate, an elastic membrane having a membrane attachment, and a fluid located within an enclosure at least partially formed by the substrate and the elastic membrane; applying an actuation force to the membrane attachment to adjust a location of the membrane attachment; and moving the membrane attachment along a guide path configured so that elastic energy within the elastic membrane is substantially unchanged as the membrane attachment is moved along the guide path.

Example 18

The method of example 17, where the guide path is configured so that a direction of an elastic force exerted by the elastic membrane remains generally normal to a direction of movement of the membrane attachment along the guide path.

Example 19

The method of any of examples 17 and 18, where the guide path is defined by a support structure, attached to the substrate, that mechanically engages with the membrane attachment.

Example 20

The method of any of examples 17-19, where the method includes a method of adjusting an ophthalmic device including the fluid lens.

The present disclosure may anticipate or include various methods, such as computer-implemented methods. Method steps may be performed by any suitable computer-executable code and/or computing system, and may be performed by the control system of a virtual and/or augmented reality system. Each of the steps of example methods may represent an algorithm whose structure may include and/or may be represented by multiple sub-steps.

In some examples, a system according to the present disclosure may include at least one physical processor and physical memory including computer-executable instructions that, when executed by the physical processor, cause the physical processor to perform an operation, such as at least one of adjusting the optical properties of a fluid lens (e.g., by energizing an actuator), displaying an augmented reality or virtual reality image, providing haptic feedback using one or more transducers, or any other appropriate operation.

In some examples, a non-transitory computer-readable medium according to the present disclosure may include one or more computer-executable instructions that, when executed by at least one processor of a computing device, cause the computing device to perform an operation, such as at least one of adjusting the optical properties of a fluid lens (e.g., by energizing an actuator), displaying an augmented reality or virtual reality image, providing haptic feedback using one or more transducers, or any other appropriate operation.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to perform a function, use the result of the transformation to perform a function, and store the result of the transformation to perform a function. Example data may include sensor data, for example, relating to an actuator configuration, focal length, membrane tension, or other property of a lens or component thereof. Example functions may include adjustment of one or more fluid lenses, for example, to modify a focal length and/or other optical property of one or more lenses. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Features from any of the embodiments described herein may be used in combination with one another in accordance with the general principles described herein. These and other embodiments, features, and advantages will be more fully understood upon reading the detailed description in conjunction with the accompanying drawings and claims.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

What is claimed is:

1. A device comprising a fluid lens, wherein the fluid lens comprises:
   a membrane, having a membrane profile;
   a membrane attachment attached to a peripheral portion of the membrane;
   a substrate;
   a fluid located within an enclosure formed at least in part by the membrane and the substrate; and
   a support structure configured to enable adjustment of the membrane profile, wherein:

the support structure engages with the membrane attachment and allows movement of the membrane attachment along a guide path to provide the adjustment of the membrane profile;

a focal length of the fluid lens is changed by the adjustment of the membrane profile;

the support structure comprises a slot through which the membrane attachment extends and a guide surface that that engages with the membrane attachment and defines the guide path; and the guide path is configured so that an elastic force exerted on the membrane attachment by the membrane is normal to the guide path as the membrane attachment moves along the guide path.

2. The device of claim 1, further comprising an actuator configured to adjust a position of the membrane attachment along the guide path.

3. The device of claim 2, wherein an elastic energy of the membrane is independent of the position of the membrane attachment along the guide path.

4. The device of claim 1, wherein:
the membrane has an elastic energy; and
the guide path is configured so that the elastic energy of the membrane does not change as the membrane attachment moves along the guide path.

5. The device of claim 1, wherein the elastic force has no component tangential to the guide path.

6. The device of claim 1, wherein:
the fluid lens has an optical axis;
locations on the guide path have a radial distance from an optical center of the fluid lens and an axial displacement from the substrate; and
the radial distance increases as the axial displacement increases.

7. The device of claim 1, wherein the guide path curves inwardly towards an optical center of the fluid lens as the membrane attachment approaches the substrate.

8. The device of claim 1, wherein the support structure further comprises at least one of a pivot or a flexure.

9. The device of claim 1, further comprising an edge seal, wherein the edge seal is configured to retain the fluid between the substrate and the membrane.

10. The device of claim 1, wherein the device comprises a plurality of support structures that comprises the support structure, wherein each support structure of the plurality of support structures is configured to engage with a respective membrane attachment.

11. The device of claim 1, wherein the substrate is a planar substrate.

12. The device of claim 1, wherein the fluid is a liquid, and the fluid lens is an adjustable liquid lens.

13. The device of claim 1, wherein the device is a head-mounted device.

14. The device of claim 1, wherein the device comprises a frame that supports both the fluid lens and an additional fluid lens.

15. The device of claim 1, wherein the device is an ophthalmic device configured to be used as eyewear.

16. The device of claim 1, wherein the device is an augmented reality device or a virtual reality device.

17. A method, comprising:
providing a fluid lens comprising a substrate, an elastic membrane having a membrane attachment, a support structure, and a fluid located within an enclosure at least partially formed by the substrate and the elastic membrane;

applying an actuation force to the membrane attachment to adjust a location of the membrane attachment; and moving the membrane attachment along a guide path, wherein:

the support structure comprises a slot through which the membrane attachment extends and a guide surface that engages with the membrane attachment and defines the guide path; and the guide path is configured so that an elastic force exerted on the membrane attachment by the membrane is normal to the guide path as the membrane attachment moves along the guide path.

18. The method of claim 17, wherein the guide path is configured so that an elastic energy within the elastic membrane is unchanged as the membrane attachment is moved along the guide path.

19. The method of claim 17, wherein the guide path is defined by the support structure, attached to the substrate, that mechanically engages with the membrane attachment.

20. The method of claim 17, wherein the method comprises a method of adjusting an ophthalmic device comprising the fluid lens.

* * * * *

UNITED STATES PATENT AND TRADEMARK OFFICE
CERTIFICATE OF CORRECTION

| | |
|---|---|
| PATENT NO. | : 11,333,803 B2 |
| APPLICATION NO. | : 16/861134 |
| DATED | : May 17, 2022 |
| INVENTOR(S) | : Herbert et al. |

Page 1 of 1

It is certified that error appears in the above-identified patent and that said Letters Patent is hereby corrected as shown below:

In the Claims

In Column 31, Line 9 (approx.), in Claim 1, delete "that that" and insert -- that --.

Signed and Sealed this
Eleventh Day of October, 2022

*Katherine Kelly Vidal*

Katherine Kelly Vidal
*Director of the United States Patent and Trademark Office*